(12) United States Patent
Srivastava et al.

(10) Patent No.: US 12,299,484 B1
(45) Date of Patent: May 13, 2025

(54) HARDWARE AND SOFTWARE CO-DESIGNED SYSTEM FOR EFFICIENT DISTRIBUTED CONTROL OF EXECUTION ON A COMPUTE ACCELERATOR

(71) Applicant: d-MATRIX CORPORATION, Cupertino, CA (US)

(72) Inventors: Satyam Srivastava, Cupertino, CA (US); Joseph P. Sprowes, Cupertino, CA (US); Mayank Gupta, Cupertino, CA (US)

(73) Assignee: d-MATRIX CORPORATION, Santa Clara, CA (US)

( * ) Notice: Subject to any disclaimer, the term of this patent is extended or adjusted under 35 U.S.C. 154(b) by 547 days.

(21) Appl. No.: 17/696,137

(22) Filed: Mar. 16, 2022

(51) Int. Cl.
G06F 9/48 (2006.01)
G06F 9/50 (2006.01)

(52) U.S. Cl.
CPC .............. *G06F 9/50* (2013.01); *G06F 9/4881* (2013.01)

(58) Field of Classification Search
CPC .................................. G06F 9/4881; G06F 9/50
See application file for complete search history.

(56) References Cited

U.S. PATENT DOCUMENTS

| | | | |
|---|---|---|---|
| 2002/0087611 A1* | 7/2002 | Tanaka ................... | G06F 9/5077 718/1 |
| 2016/0070603 A1* | 3/2016 | Lu .......................... | G06F 9/5088 718/104 |
| 2017/0132037 A1* | 5/2017 | Sevigny ................ | G06F 9/4881 |
| 2019/0146705 A1* | 5/2019 | Lin ........................ | G06F 3/0659 711/103 |
| 2020/0073713 A1* | 3/2020 | Nield ..................... | G06F 9/4881 |
| 2020/0110676 A1* | 4/2020 | Volos .................... | G06F 11/203 |

* cited by examiner

*Primary Examiner* — Jacob Petranek
(74) *Attorney, Agent, or Firm* — Richard T. Ogawa; Ogawa P.C.

(57) ABSTRACT

A hardware and software co-designed dispatch engine (DE) apparatus. The DE apparatus can be configured to store a compute workload having groups of tasks in the form of a hierarchy of serial and/or concurrent queues in a task queue. Also, the DE can use various hardware modules to asynchronously delegate the tasks to various resources or destination devices and to track the completion of such tasks and task groups in an efficient manner. The DE can also include an interrupt/completion handler module, a resource monitor module, and a task dispatcher module configured with the task queue module to track and dispatch work units that are sent to various destination devices for processing. Using this approach, the DE apparatus can be configured with a processing unit to coordinate the processing of work units in a manner that efficient uses the most critical resources with minimal added cost of silicon area.

7 Claims, 17 Drawing Sheets

HARDWARE AND SOFTWARE CO-DESIGNED SYSTEM FOR EFFICIENT DISTRIBUTED CONTROL OF EXECUTION ON A COMPUTE ACCELERATOR

CROSS-REFERENCES TO RELATED APPLICATIONS

N/A

BACKGROUND OF THE INVENTION

The present invention relates generally to integrated circuit (IC) devices and artificial intelligence (AI). More specifically, the present invention relates to methods and device structures for accelerating computing workloads, such as those in transformer-based models (a.k.a. transformers).

The transformer has been the dominant neural network architecture in the natural language processing (NLP) field, and its use continues to expand into other machine learning applications. The original Transformer was introduced in the paper "Attention is all you need" (Vaswani et al., 2017), which sparked the development of many transformer model variations, such as the generative pre-trained transformer (GPT) and the bidirectional encoder representations from transformers (BERT) models. Such transformers have significantly outperformed other models in inference tasks by their use of a self-attention mechanism that avoids recursion and allows for easy parallelism. On the other hand, the transformer workloads are very computationally intensive and have high memory requirements, and have been plagued as being time-intensive and inefficient.

Most recently, NLP models have grown by a thousand times in both model size and compute requirements. For example, it can take about 4 months for 1024 graphics processing units (GPUs) to train a model like GPT-3 with 175 billion parameters. New NLP models having a trillion parameters are already being developed, and multi-trillion parameter models are on the horizon. Such rapid growth has made it increasingly difficult to serve NLP models at scale.

From the above, it can be seen that improved devices and methods to accelerate compute workloads for AI are highly desirable.

BRIEF SUMMARY OF THE INVENTION

The present invention relates generally to integrated circuit (IC) devices and artificial intelligence (AI) systems. More particularly, the present invention relates to methods and device structures for accelerating computing workloads, such as those in transformer-based neural network models (a.k.a. transformers) and the like. These methods and structures can be used in machine/deep learning applications such as natural language processing (NLP), computer vision (CV), and the like. Merely by way of example, the invention has been applied to AI accelerator apparatuses and chiplet devices configured in a PCIe card.

According to an example, the present invention provides for a dispatch engine (DE) apparatus using a hardware and software co-designed structure for efficient distributed control over the execution of AI-related workloads in an AI accelerator apparatus. To address the overheads of the control plane in such AI systems, a dispatch engine (DE) apparatus can be configured to store a compute workload having groups of tasks in the form of a hierarchy of serial and/or concurrent queues in a task queue. Also, the DE apparatus can use various hardware modules to asynchronously delegate the tasks to various resources or destination devices and to track the completion of such tasks and task groups in an efficient manner.

In an example, the present invention provides a DE apparatus configured as an IC for an AI accelerator IC. The apparatus can include a task queue module having plurality of rows, numbered from 1 to N (e.g., N>4), and a plurality of columns, numbered from 1 to M (e.g., M>4), and a plurality of cells. Each of the plurality of cells is defined by one of the rows and one of the columns. The task queue module can be configured to receive one or more task groups, each of which can have a plurality of work units configured in a hierarchy of queues format. The task queue module can be configured to store each of the plurality of work units of each task group in one of the plurality of cells such that the work units are stored according to the hierarchy of queues.

The DE apparatus can also include an interrupt/completion handler module, a resource monitor module, and a task dispatcher module configured with the task queue module to track and dispatch work units that are sent to various destination devices for processing. The completion handler module can be coupled between a plurality of destination devices and each of the plurality of cells in the task queue module, and can be configured to send a completion signal upon a completion condition to update a status of one or more of the plurality of cells. The resource monitor can be coupled to each of the plurality of cells in the task queue module, and can be configured to monitor a state of each of the plurality of destination devices. Further, the task dispatcher module can be coupled to each of the plurality of cells in the task queue module, and can be configured to asynchronously dispatch the work unit stored in each of the plurality of cells to one of the plurality of destination devices in a parallel pipeline process using a bus device coupled to the task queue module such that each cell is configured to communicate through the bus device to one of the plurality of destination devices.

The DE architecture and its related methods can provide many benefits. The hierarchy of queues scheme provides a unique data structure to store AI workloads in a self-updating manner. Also, the hardware units of the DE apparatus allow the stored AI workloads to be autonomously and asynchronously dispatched to executed at destination devices. Using multiple work descriptors/control sets, a processing unit (e.g., CPU) configured with the DE apparatus can create work ahead-of-time and group work items such that the most critical resources are efficiently utilized. Further, these benefits can be realized in IC chips and chiplet devices with minimal added cost of silicon area.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

The present invention relates generally to integrated circuit (IC) devices and artificial intelligence (AI) systems. More particularly, the present invention relates to methods and device structures for accelerating computing workloads in transformer-based neural network models (a.k.a. transformers). These methods and structures can be used in machine/deep learning applications such as natural language processing (NLP), computer vision (CV), and the like. Merely by way of example, the invention has been applied to AI accelerator apparatuses and chiplet devices configured to perform high throughput operations for NLP.

Currently, the vast majority of NLP models are based on the transformer model, such as the bidirectional encoder representations from transformers (BERT) model, BERT Large model, and generative pre-trained transformer (GPT) models such as GPT-2 and GPT-3, etc. However, these transformers have very high compute and memory requirements. According to an example, the present invention provides for an apparatus using chiplet devices that are configured to accelerate transformer computations for AI applications. Examples of the AI accelerator apparatus are shown in FIGS. 1A and 1B.

Figure 1A:
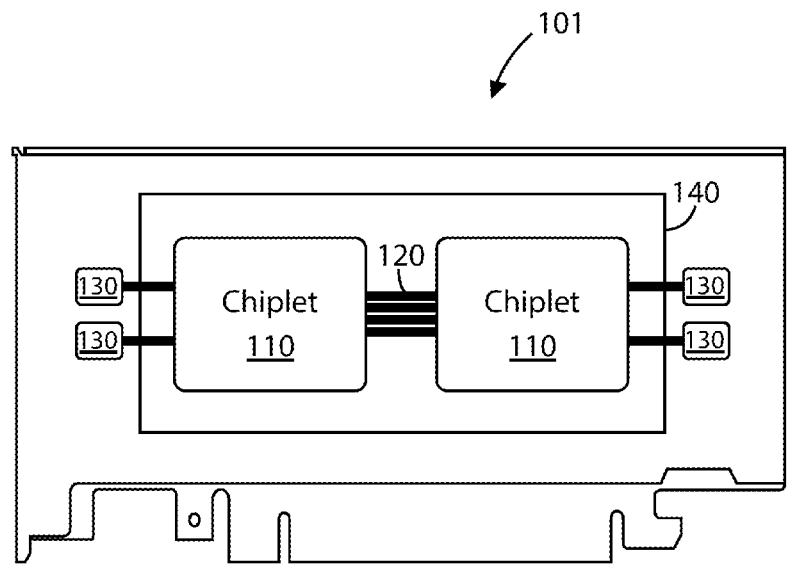
FIG. 1A-1B are simplified block diagrams illustrating AI accelerator apparatuses according to examples of the present invention.

FIG. 1A illustrates a simplified AI accelerator apparatus 101 with two chiplet devices 110. As shown, the chiplet devices 110 are coupled to each other by one or more die-to-die (D2D) interconnects 120. Also, each chiplet device 110 is coupled to a memory interface 130 (e.g., static random access memory (SRAM), dynamic random access memory (DRAM), synchronous dynamic RAM (SDRAM), or the like). The apparatus 101 also includes a substrate member 140 that provides mechanical support to the chiplet devices 110 that are configured upon a surface region of the substrate member 140. The substrate can include interposers, such as a silicon interposer, glass interposer, organic interposer, or the like. The chiplets can be coupled to one or more interposers, which can be configured to enable communication between the chiplets and other components (e.g., serving as a bridge or conduit that allows electrical signals to pass between internal and external elements).

Figure 1B:
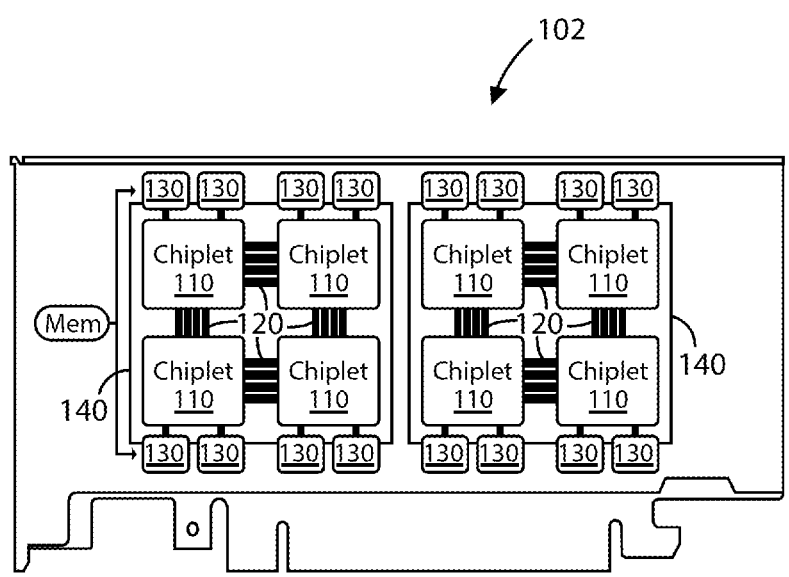

FIG. 1B illustrates a simplified AI accelerator apparatus 102 with eight chiplet devices 110 configured in two groups of four chiplets on the substrate member 140. Here, each chiplet device 110 within a group is coupled to other chiplet devices by one or more D2D interconnects 120. Apparatus 102 also shows a DRAM memory interface 130 coupled to each of the chiplet devices 110. The DRAM memory interface 130 can be coupled to one or more memory modules, represented by the "Mem" block.

As shown, the AI accelerator apparatuses 101 and 102 are embodied in peripheral component interconnect express (PCIe) card form factors, but the AI accelerator apparatus can be configured in other form factors as well. These PCIe card form factors can be configured in a variety of dimensions (e.g., full height, full length (FHFL); half height, half length (HHHL), etc.) and mechanical sizes (e.g., 1×, 2×, 4×, 16×, etc.). In an example, one or more substrate members 140, each having one or more chiplets, are coupled to a PCIe card. Those of ordinary skill in the art will recognize other variations, modifications, and alternatives to these elements and configurations of the AI accelerator apparatus.

Embodiments of the AI accelerator apparatus can implement several techniques to improve performance (e.g., computational efficiency) in various AI applications. The AI accelerator apparatus can include digital in-memory-compute (DIMC) to integrate computational functions and memory fabric. Algorithms for the mapper, numerics, and sparsity can be optimized within the compute fabric. And, use of chiplets and interconnects configured on organic interposers can provide modularity and scalability.

According to an example, the present invention implements chiplets with in-memory-compute (IMC) functionality, which can be used to accelerate the computations required by the workloads of transformers. The computations for training these models can include performing a scaled dot-product attention function to determine a probability distribution associated with a desired result in a particular AI application. In the case of training NLP models, the desired result can include predicting subsequent words, determining contextual word meaning, translating to another language, etc.

The chiplet architecture can include a plurality of slice devices (or slices) controlled by a central processing unit (CPU) to perform the transformer computations in parallel. Each slice is a modular IC device that can process a portion of these computations. The plurality of slices can be divided into tiles/gangs (i.e., subsets) of one or more slices with a CPU coupled to each of the slices within the tile. This tile CPU can be configured to perform transformer computations in parallel via each of the slices within the tile. A global CPU can be coupled to each of these tile CPUs and be configured to perform transformer computations in parallel via all of the slices in one or more chiplets using the tile CPUs. Further details of the chiplets are discussed in reference to FIGS. 2A-5B, while transformers are discussed in reference to FIGS. 6-9.

Figure 2A:
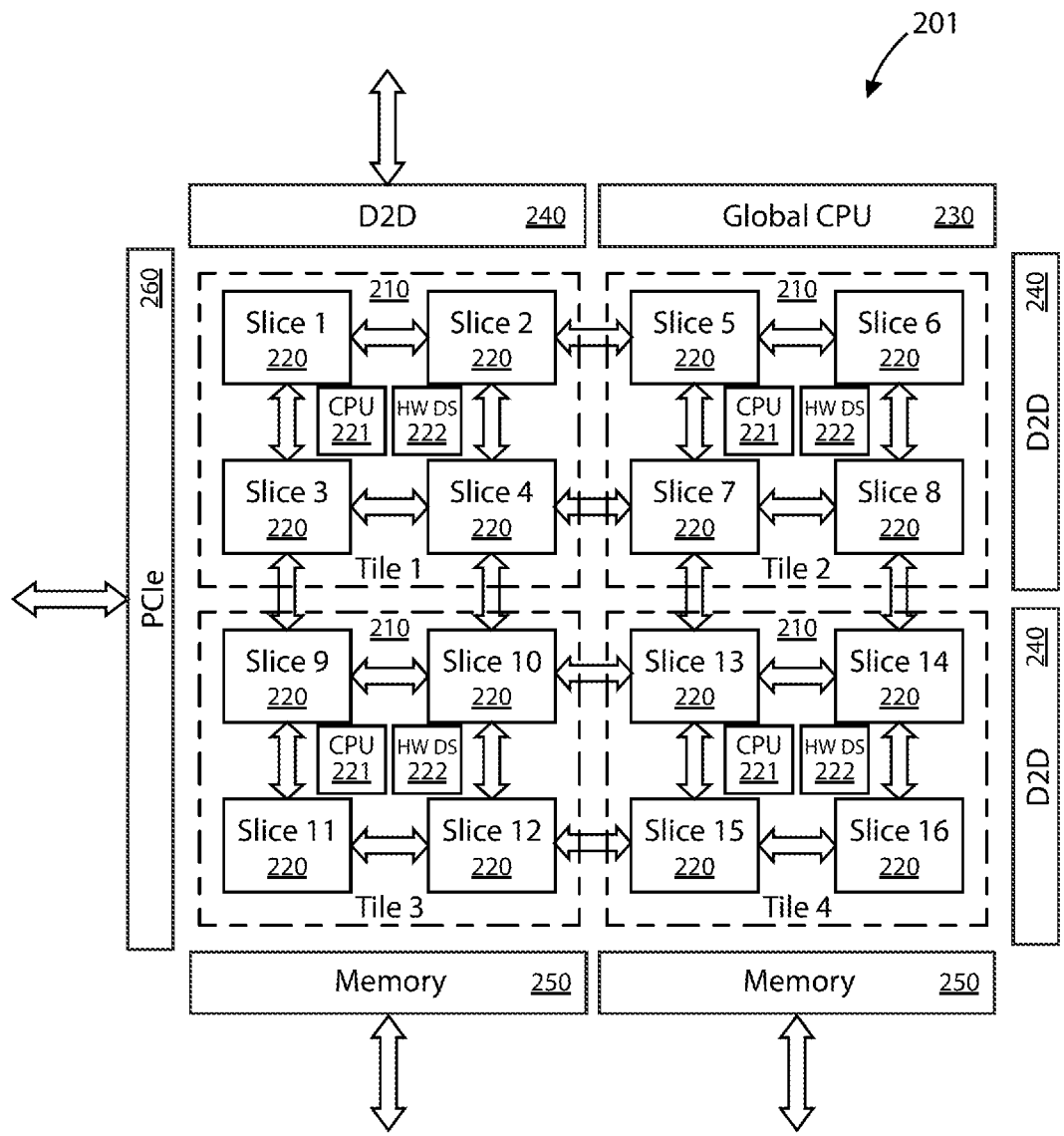
FIGS. 2A-2B are simplified block diagrams illustrating 16-slice chiplet devices according to examples of the present invention.

FIG. 2A is a simplified block diagram illustrating an example configuration of a 16-slice chiplet device 201. In this case, the chiplet 201 includes four tile devices 210, each of which includes four slice devices 220, a CPU 221, and a hardware dispatch (HW DS) device 222. In a specific example, these tiles 210 are arranged in a symmetrical manner. As discussed previously, the CPU 221 of a tile 210 can coordinate the operations performed by all slices within the tile. The HW DS 222 is coupled to the CPU 221 and can be configured to coordinate control of the slices 220 in the tile 210 (e.g., to determine which slice in the tile processes a target portion of transformer computations). In a specific example, the CPU 221 can be a reduced instruction set computer (RISC) CPU, or the like. Further, the CPU 221 can be coupled to a dispatch engine, which is configured to coordinate control of the CPU 221 (e.g., to determine which portions of transformer computations are processed by the particular CPU).

The CPUs 221 of each tile 210 can be coupled to a global CPU via a global CPU interface 230 (e.g., buses, connectors, sockets, etc.). This global CPU can be configured to coordinate the processing of all chiplet devices in an AI accelerator apparatus, such as apparatuses 101 and 102 of FIGS. 1A and 1B, respectively. In an example, a global CPU can use the HW DS 222 of each tile to direct each associated CPU 221 to perform various portions of the transformer computations across the slices in the tile. Also, the global CPU can be a RISC processor, or the like. The chiplet 201 also includes D2D interconnects 240 and a memory interface 250, both of which are coupled to each of the CPUs 221 in each of the tiles. In an example, the D2D interconnects can be configured with single-ended signaling. The memory interface 250 can include one or more memory buses coupled to one or more memory devices (e.g., DRAM, SRAM, SDRAM, or the like).

Further, the chiplet 201 includes a PCIe interface/bus 260 coupled to each of the CPUs 221 in each of the tiles. The PCIe interface 260 can be configured to communicate with a server or other communication system. In the case of a plurality of chiplet devices, a main bus device is coupled to the PCIe bus 260 of each chiplet device using a master chiplet device (e.g., main bus device also coupled to the master chiplet device). This master chiplet device is coupled to each other chiplet device using at least the D2D interconnects 240. The master chiplet device and the main bus device can be configured overlying a substrate member (e.g., same substrate as chiplets or separate substrate). An apparatus integrating one or more chiplets can also be coupled to a power source (e.g., configured on-chip, configured in a system, or coupled externally) and can be configured and operable to a server, network switch, or host system using the main bus device. The server apparatus can also be one of a plurality of server apparatuses configured for a server farm within a data center, or other similar configuration.

In a specific example, an AI accelerator apparatus configured for GPT-3 can incorporate eight chiplets (similar to apparatus 102 of FIG. 1B). The chiplets can be configured with D2D 16×16 Gb/s interconnects, 32-bit LPDDR5 6.4 Gb/s memory modules, and 16 lane PCIe Gen 5 PHY NRZ 32 Gb/s/lane interface. LPDDR5 (16×16 GB) can provide the necessary capacity, bandwidth and low power for large scale NLP models, such as quantized GPT-3. Of course, there can be other variations, modifications, and alternatives.

Figure 2B:
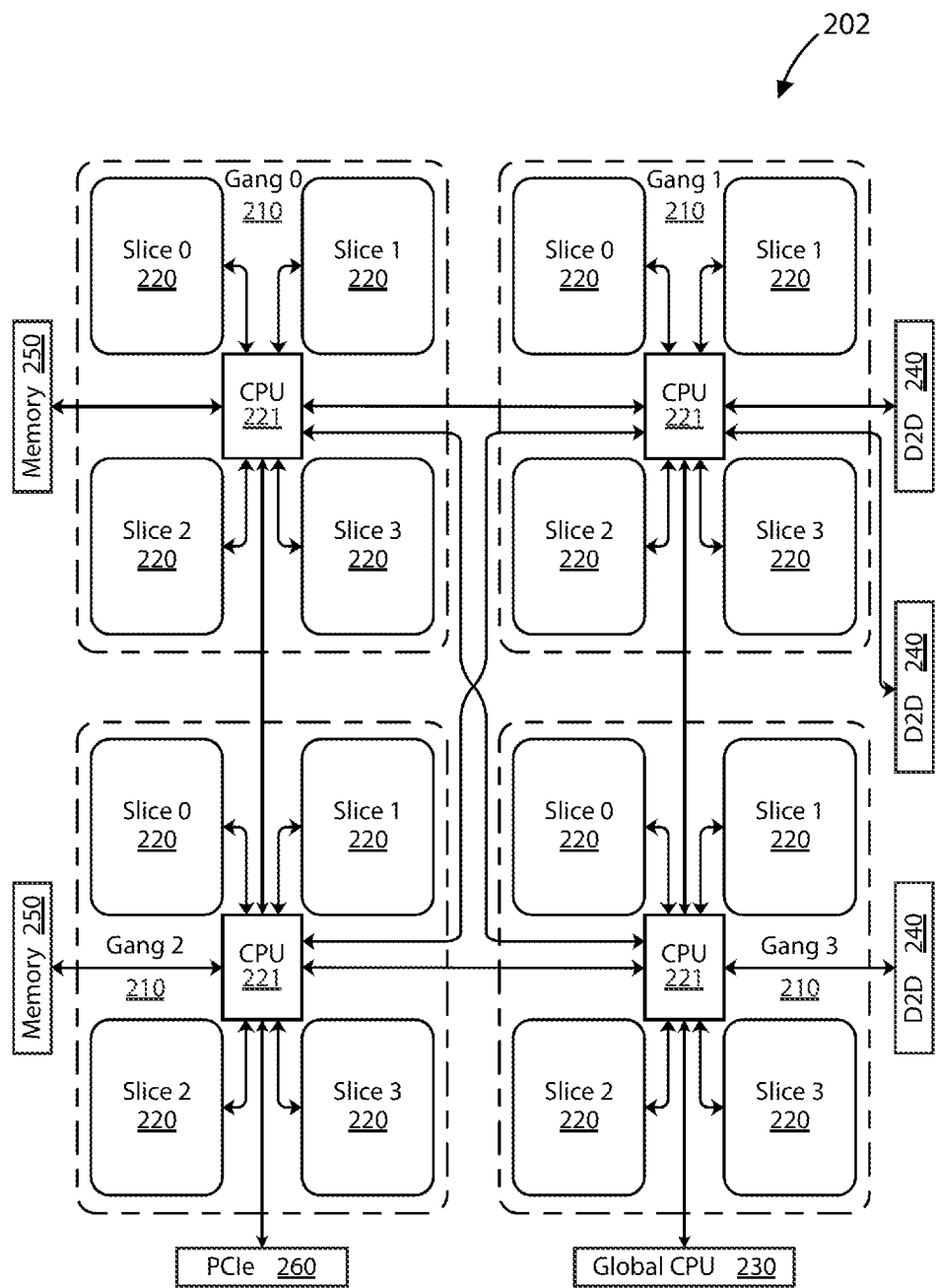

FIG. 2B is a simplified block diagram illustrating an example configuration of a 16-slice chiplet device 202. Similar to chiplet 201, chiplet 202 includes four gangs 210 (or tiles), each of which includes four slice devices 220 and a CPU 221. As shown, the CPU 221 of each gang/tile 210 is coupled to each of the slices 220 and to each other CPU 221 of the other gangs/tiles 210. In an example, the tiles/gangs serve as neural cores, and the slices serve as compute cores. With this multi-core configuration, the chiplet device can be configured to take and run several computations in parallel. The CPUs 221 are also coupled to a global CPU interface 230, D2D interconnects 240, a memory interface 250, and a PCIe interface 260. As described for FIG. 2A, the global CPU interface 230 connects to a global CPU that controls all of the CPUs 221 of each gang 210.

Figure 3A:
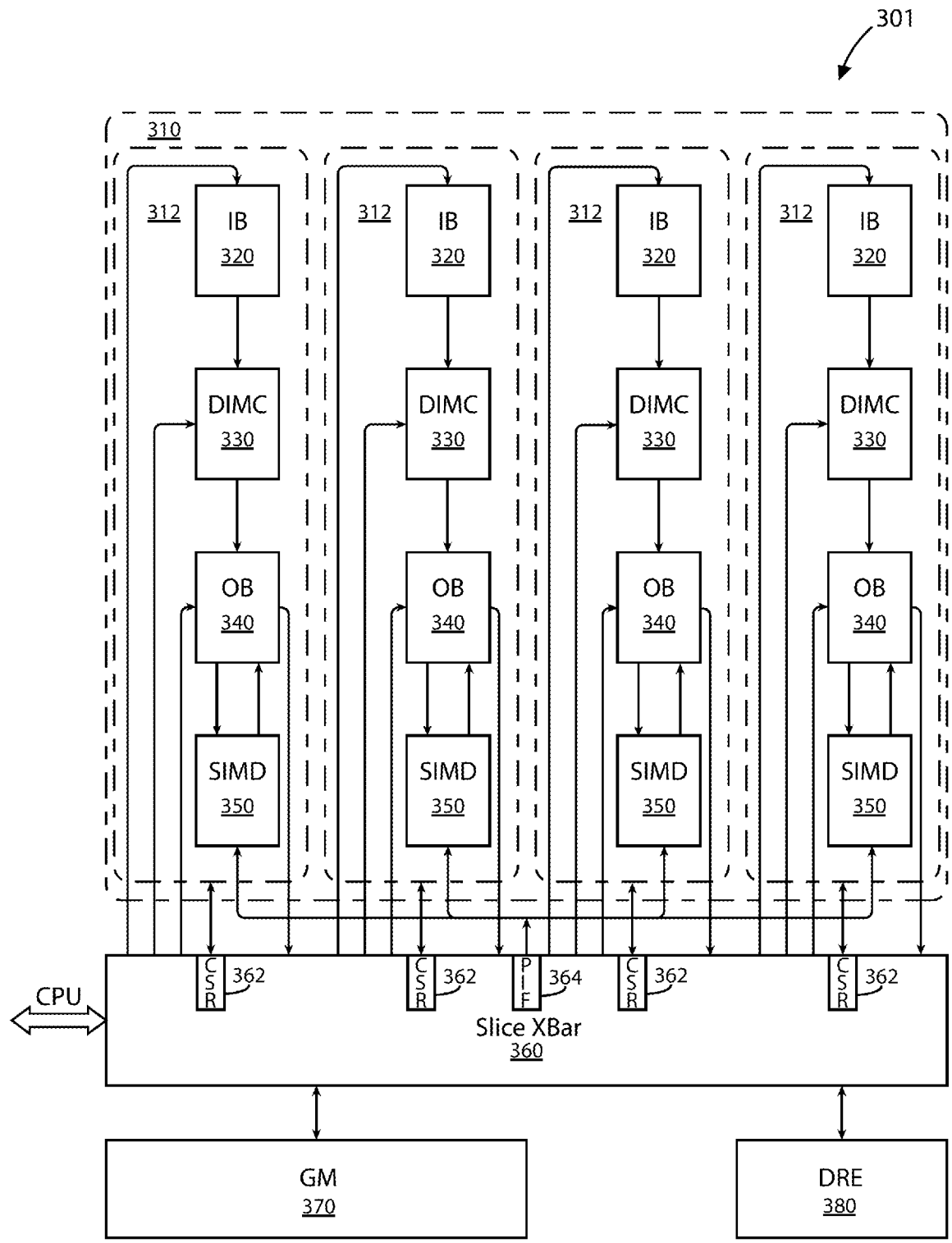
FIGS. 3A-B are simplified block diagrams illustrating slice devices according to examples of the present invention.

FIG. 3A is a simplified block diagram illustrating an example slice device 301 of a chiplet. For the 16-slice chiplet example, slice device 301 includes a compute core 310 having four compute paths 312, each of which includes an input buffer (IB) device 320, a digital in-memory-compute (DIMC) device 330, an output buffer (OB) device 340, and a Single Instruction, Multiple Data (SIMD) device 350 coupled together. Each of these paths 312 is coupled to a slice cross-bar/controller 360, which is controlled by the tile CPU to coordinate the computations performed by each path 312.

In an example, the DIMC is coupled to a clock and is configured within one or more portions of each of the plurality of slices of the chiplet to allow for high throughput of one or more matrix computations provided in the DIMC such that the high throughput is characterized by 512 multiply accumulates per a clock cycle. In a specific example, the clock coupled to the DIMC is a second clock derived from a first clock (e.g., chiplet clock generator, AI accelerator apparatus clock generator, etc.) configured to output a clock signal of about 0.5 GHz to 4 GHz; the second clock can be configured at an output rate of about one half of the rate of the first clock. The DIMC can also be configured to support a block structured sparsity (e.g., imposing structural constraints on weight patterns of a neural networks like a transformer).

In an example, the SIMD device 350 is a SIMD processor coupled to an output of the DIMC. The SIMD 350 can be configured to process one or more non-linear operations and one or more linear operations on a vector process. The SIMD 350 can be a programmable vector unit or the like. The SIMD 350 can also include one or more random-access memory (RAM) modules, such as a data RAM module, an instruction RAM module, and the like.

In an example, the slice controller 360 is coupled to all blocks of each compute path 312 and also includes a control/status register (CSR) 362 coupled to each compute path. The slice controller 360 is also coupled to a memory bank 370 and a data reshape engine (DRE) 380. The slice controller 360 can be configured to feed data from the memory bank 370 to the blocks in each of the compute paths 312 and to coordinate these compute paths 312 by a processor interface (PIF) 364. In a specific example, the PIF 364 is coupled to the SIMD 350 of each compute path 312.

Figure 3B:
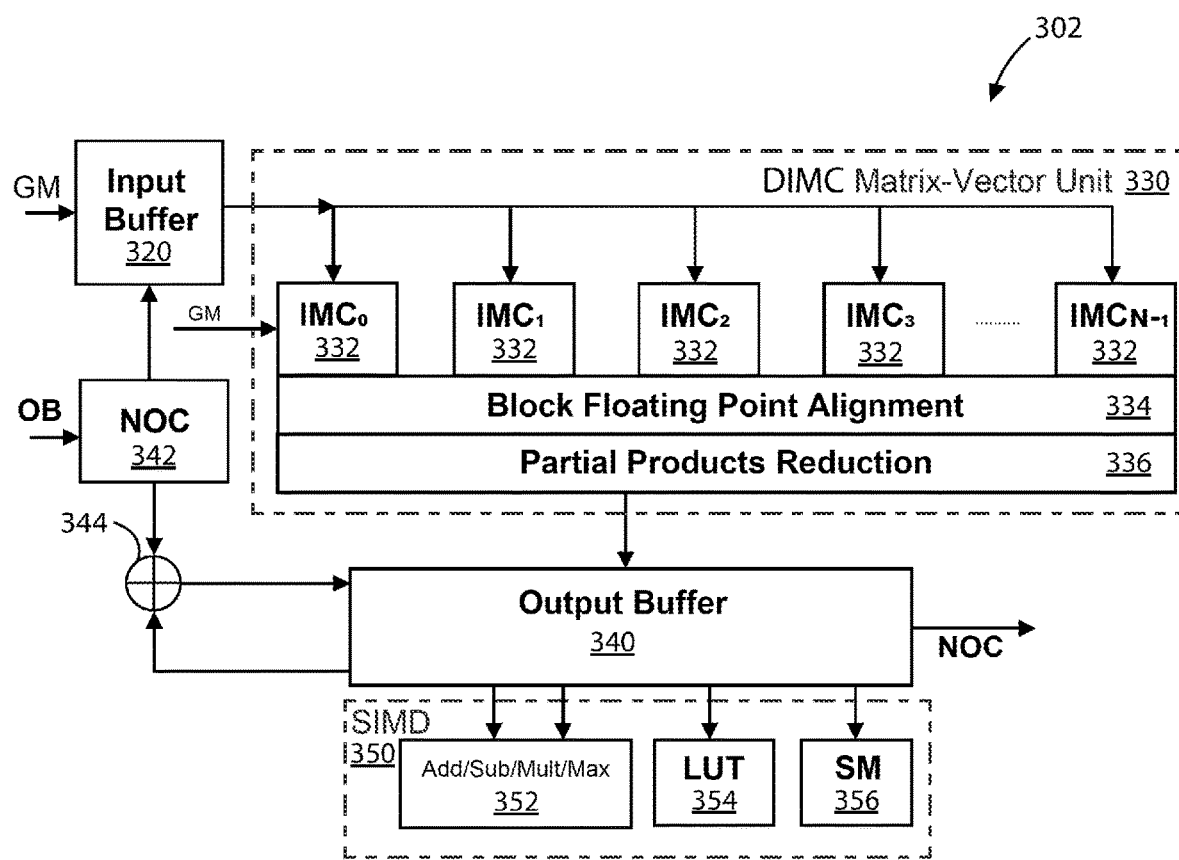

Further details for the compute core 310 are shown in FIG. 3B. The simplified block diagram of slice device 302 includes an input buffer 320, a DIMC matrix vector unit 330, an output buffer 340, a network on chip (NoC) device 342, and a SIMD vector unit 350. The DIMC unit 330 includes a plurality of in-memory-compute (IMC) modules 332 configured to compute a Scaled Dot-Product Attention function on input data to determine a probability distribution, which requires high-throughput matrix multiply-accumulate operations.

These IMC modules 332 can also be coupled to a block floating point alignment module 334 and a partial products reduction module 336 for further processing before outputting the DIMC results to the output buffer 540. In an example, the input buffer 320 receives input data (e.g., data vectors) from the memory bank 370 (shown in FIG. 3A) and sends the data to the IMC modules 332. The IMC modules 332 can also receive instructions from the memory bank 370 as well.

In addition to the details discussed previously, the SIMD 350 can be configured as an element-wise vector unit. The SIMD 350 can include a computation unit 352 (e.g., add, subtract, multiply, max, etc.), a look-up table (LUT) 354, and a state machine (SM) module 356 configured to receive one or more outputs from the output buffer 340.

The NoC device 342 is coupled to the output buffer 340 configured in a feedforward loop via shortcut connection 344. Also, the NoC device 342 is coupled to each of the slices and is configured for multicast and unicast processes. More particularly, the NoC device 342 can be configured to connect all of the slices and all of the tiles, multi-cast input activations to all of the slices/tiles, and collect the partial computations to be unicast for a specially distributed accumulation.

Considering the previous eight-chiplet AI accelerator apparatus example, the input buffer can have a capacity of 64 KB with 16 banks and the output buffer can have a capacity of 128 KB with 16 banks. The DIMC can be an 8-bit block have dimensions 64×64 (eight 64×64 IMC modules) and the NoC can have a size of 512 bits. The computation block in the SIMD can be configured for 8-bit and 32-bit integer (int) and unsigned integer (uint) computations. These slice components can vary depending on which transformer the AI accelerator apparatus will serve.

Figure 4:
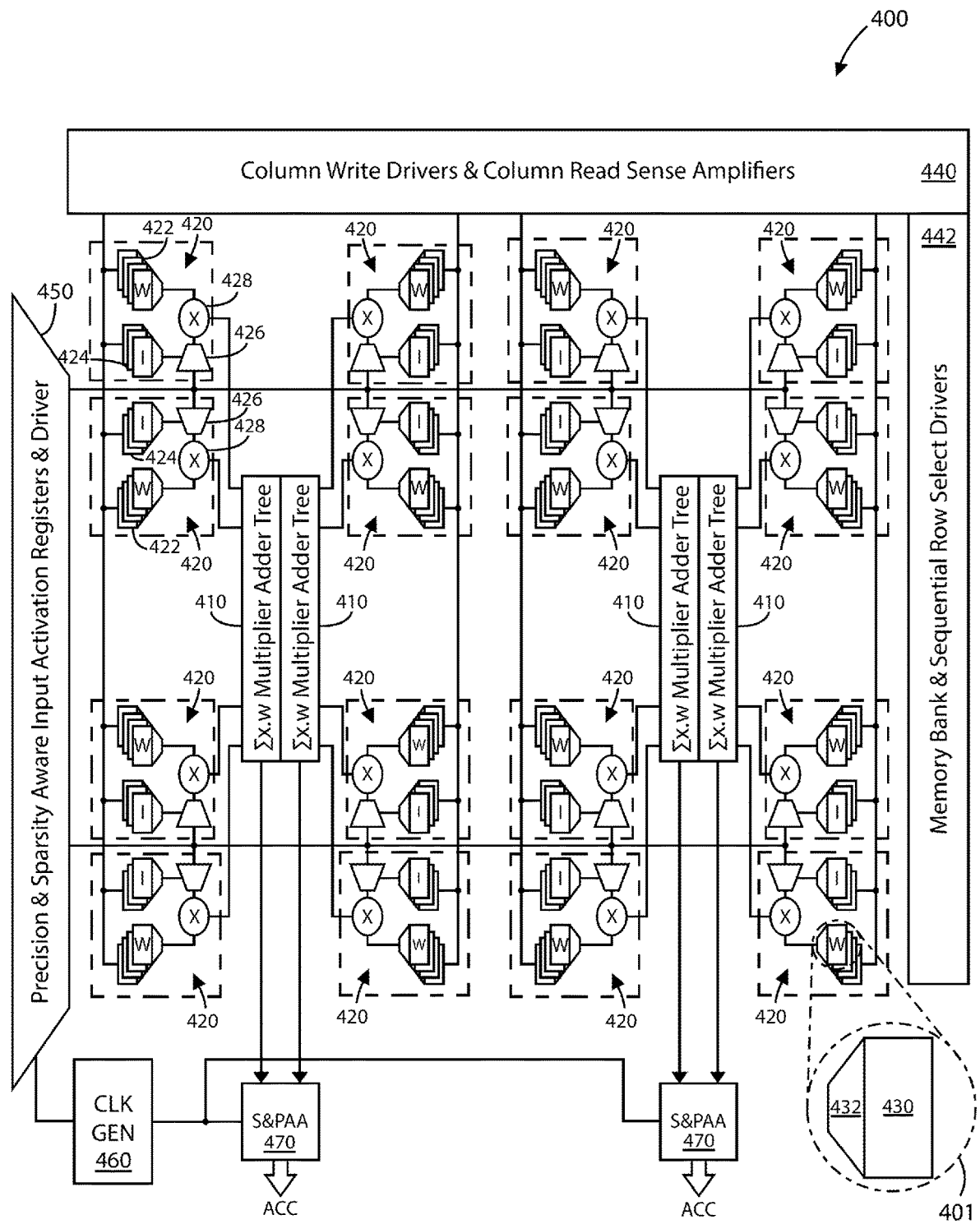
FIG. 4 is a simplified block diagram illustrating an in-memory-compute (IMC) module according to an example of the present invention.

FIG. 4 is a simplified block diagram illustrating an example IMC module 700. As shown, module 700 includes one or more computation tree blocks 410 that are configured to perform desired computations on input data from one or more read-write blocks 420. Each of these read-write blocks 420 includes one or more first memory-select units 422 (also denoted as "W"), one or more second memory-select units 424 (also denoted as "I"), an activation multiplexer 426, and an operator unit 428. The first memory-select unit 422 provides an input to the operator unit 428, while the second memory-select unit 424 controls the activation multiplexer 426 that is also coupled to the operator unit 428. In the case of multiply-accumulate operations, the operator unit 428 is a multiplier unit and the computation tree blocks 410 are multiplier adder tree blocks (i.e., $\Sigma x \cdot w$).

As shown in close-up 401, each of the memory-select units 422, 424 includes a memory cell 430 (e.g., SRAM cell, or the like) and a select multiplexer 432. Each of the memory-select units 422, 424 is coupled to a read-write controller 440, which is also coupled to a memory bank/driver block 442. In an example, the read-write controller 440 can be configured with column write drivers and column read sense amplifiers, while the memory bank/driver block 432 can configured with sequential row select drivers.

An input activation controller 450 can be coupled to the activation multiplexer 426 each of the read-write blocks 420. The input activation controller 450 can include precision and sparsity aware input activation register and drivers. The operator unit 428 receives the output of the first memory-select unit 422 and receives the output of this block 450 through the activation multiplexer 426, which is controlled by the output of the second memory-select unit 424. The output of the operator unit 428 is then fed into the computation tree block 410.

The input activation block 450 is also coupled to a clock source/generator 460. As discussed previously, the clock generator 460 can produce a second clock derived from a first clock configured to output a clock signal of about 0.5 GHz to 4 GHz; the second clock can be configured at an output rate of about one half of the rate of the first clock. The clock generator 460 is coupled to one or more sign and precision aware accumulators 470, which are configured to receive the output of the computation tree blocks 410. In an example, an accumulator 470 is configured to receive the outputs of two computation tree blocks 410. Example output readings of the IMC are shown in FIGS. 13A-13C.

Referring back to the eight-chiplet AI accelerator apparatus example, the memory cell can be a dual bank 2×6T SRAM cell, and the select multiplexer can be an 8T bank select multiplexer. In this case, the memory bank/driver block 442 includes a dual-bank SRAM bank. Also, the read/write controller can include 64 bytes of write drivers and 64 bytes of read sense amplifiers. Those of ordinary skill in the art will recognize other variations, modifications, and alternatives to these IMC module components and their configurations.

Figure 5A:
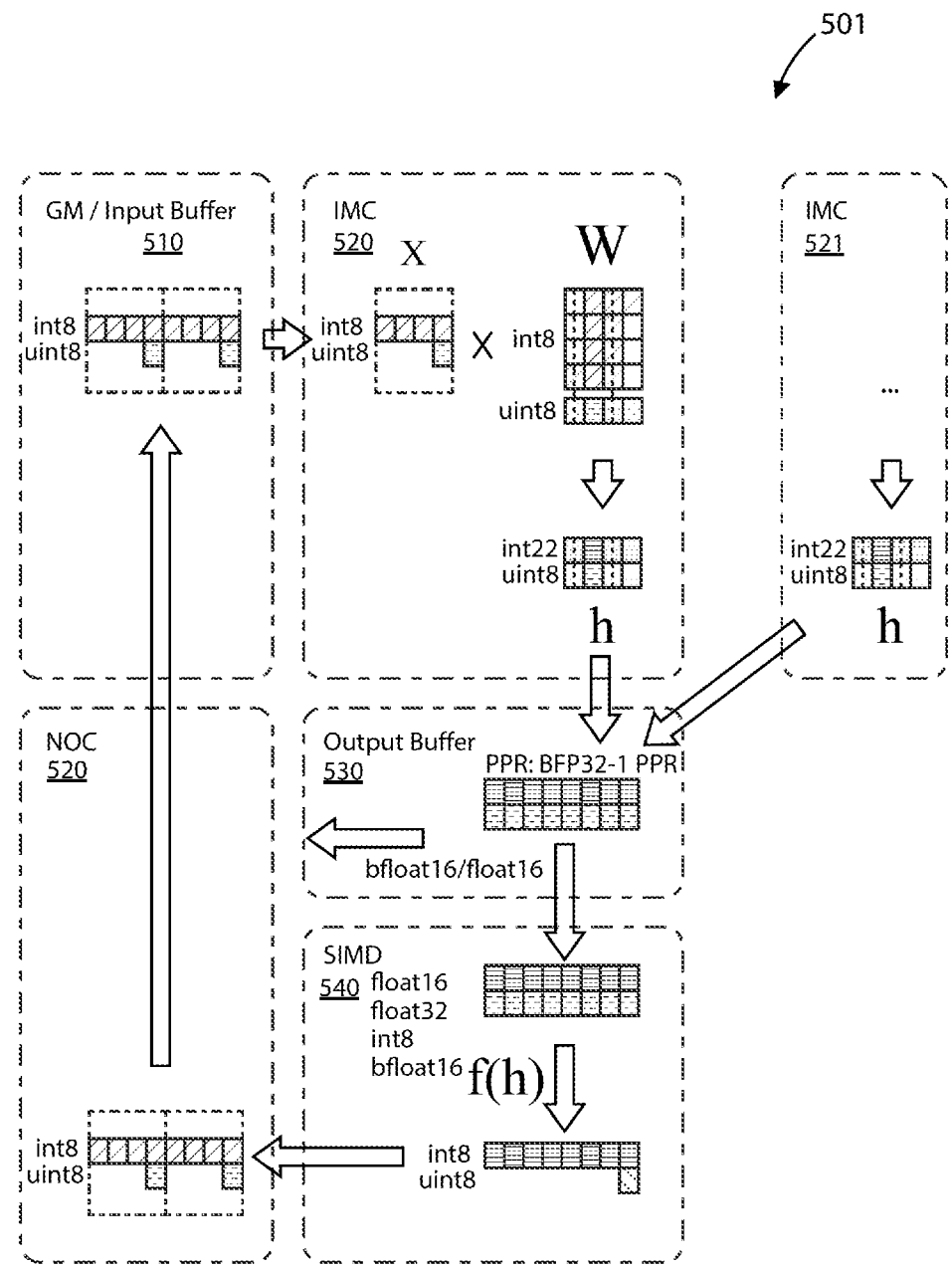
FIG. 5A is a simplified block flow diagram illustrating numerical formats of the data being processed in a slice device according to an example of the present invention.

FIG. 5A is a simplified block flow diagram illustrating example numerical formats of the data being processed in a slice. Diagram 501 shows a loop with the data formats for the GM/input buffer 510, the IMC 520, the output buffer 530, the SIMD 540, and the NoC 550, which feeds back to the GM/input buffer 510. The IMC block 520 shows the multiply-accumulate operation ($\Sigma x \cdot w$). Additionally, the format for the data from IMC 532 flows to the output buffer 530 as well. In this example, the numerical formats include integer (int), floating point (float), and block floating (bfloat) of varying lengths.

Figure 5B:
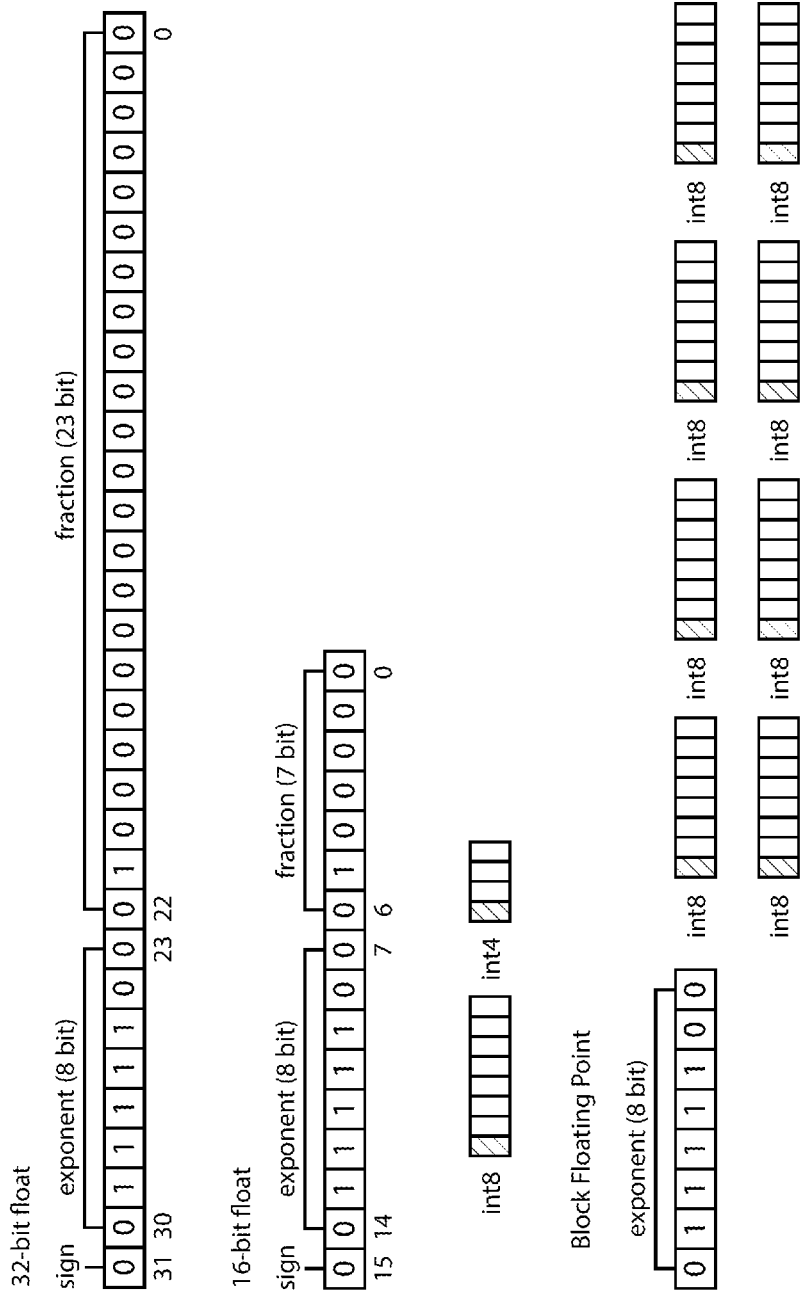
FIG. 5B is a simplified diagram illustrating example numerical formats.

FIG. 5B is a simplified diagram illustrating certain numerical formats, including certain formats shown in FIG. 5A. Block floating point numerics can be used to address certain barriers to performance. Training of transformers is generally done in floating point, i.e., 32-bit float or 16-bit float, and inference is generally done in 8-bit integer ("int8"). With block floating point, an exponent is shared across a set of mantissa significant values (see diagonally line filled blocks of the int8 vectors at the bottom of FIG. 5B), as opposed to floating point where each mantissa has a separate exponent (see 32-bit float and 16-bit float formats at the top of FIG. 5A). The method of using block floating point numerical formats for training can exhibit the efficiency of fixed point without the problems of integer arithmetic, and can also allow for use of a smaller mantissa, e.g., 4-bit integer ("int4") while retaining accuracy. Further, by using the block floating point format (e.g., for activation, weights, etc.) and sparsity, the inference of the training models can be accelerated for better performance. Those of ordinary skill in the art will recognize other variations, modifications, and alternatives to these numerical formats used to process transformer workloads.

Figure 6:
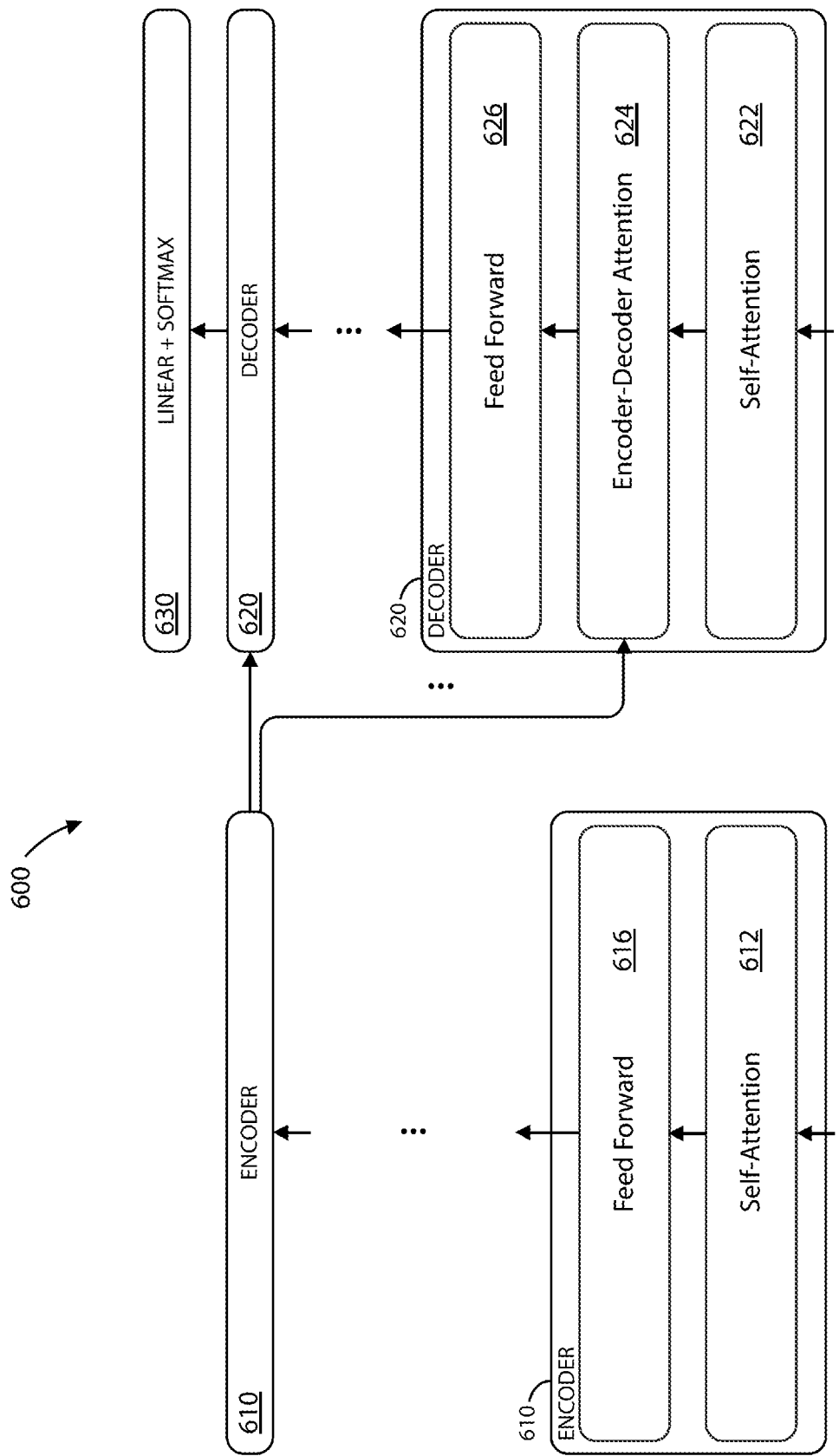
FIG. 6 is a simplified block diagram of a transformer architecture.

FIG. 6 illustrates a simplified transformer architecture 600. The typical transformer can be described as having an encoder stack configured with a decoder stack, and each such stack can have one or more layers. Within the encoder layers 610, a self-attention layer 612 determines contextual information while encoding input data and feeds the encoded data to a feed-forward neural network 616. The encoder layers 610 process an input sequence from bottom to top, transforming the output into a set of attention vectors K and V. The decoder layers 620 also include a corresponding self-attention layer 622 and feed-forward neural network 626, and can further include an encoder-decoder attention layer 624 uses the attention vectors from the encoder stack that aid the decoder in further contextual processing. The decoder stack outputs a vector of floating points (as discussed for FIG. 5B), which is fed to linear and softmax layers 630 to project the output into a final desired result (e.g., desired word prediction, interpretation, or translation). The linear layer is a fully-connected neural network that projects the decoder output vector into a larger vector (i.e., logits vector) that contains scores associated with all potential results (e.g., all potential words), and the softmax layer turns these scores into probabilities. Based on the probability output, the projected word meaning may be chosen based on the highest probability or by other derived criteria depending on the application.

Transformer model variations include those based on just the decoder stack (e.g., transformer language models such as GPT-2, GPT-3, etc.) and those based on just the encoder stack (e.g., masked language models such as BERT, BERT Large, etc.). Transformers are based on four parameters: sequence length(S) (i.e., number of tokens), number of attention heads (A), number of layers (L), and embedding length (H). Variations of these parameters are used to build practically all transformer-based models today. Embodiments of the present invention can be configured for any similar model types.

A transformer starts as untrained and is pre-trained by exposure to a desired data set for a desired learning application. Transformer-based language models are exposed to large volumes of text (e.g., Wikipedia) to train language processing functions such as predicting the next word in a text sequence, translating the text to another language, etc. This training process involves converting the text (e.g., words or parts of words) into token IDs, evaluating the context of the tokens by a self-attention layer, and predicting the result by a feed forward neural network.

The self-attention process includes (1) determining query (Q), key (K), and value (V) vectors for the embedding of each word in an input sentence, (2) calculating a score for from the dot product of Q and K for each word of the input sentence against a target word, (3) dividing the scores by the square root of the dimension of K, (4) passing the result through a softmax operation to normalize the scores, (5) multiplying each V by the softmax score, and (6) summing up the weighted V vectors to produce the output.

Many things impact the performance of such transformer architectures. The softmax function tends to be the critical path of the transformer layers (and has been difficult to accelerate in hardware). Requirements for overlapping the compute, SIMD operations and NoC transfers also impacts performance. Further, efficiency of NoC, SIMD, and memory bandwidth utilization is important as well.

Different techniques can be applied in conjunction with the AI accelerator apparatus and chiplet device examples to improve performance, such as quantization, sparsity, knowledge distillation, efficient tokenization, and software optimizations. Supporting variable sequence length (i.e., not requiring padding to the highest sequence lengths) can also reduce memory requirements. Other techniques can include optimizations of how to split self-attention among slices and chips, moving layers and tensors between the slices and chips, and data movement between layers and FC matrices.

According to an example, the present invention provides for an AI accelerator apparatus (such as shown in FIGS. 1A and 1B) coupled to an aggregate of transformer devices (e.g., BERT, BERT Large, GPT-2, GPT-3, or the like). In a specific example, this aggregate of transformer devices can include a plurality of transformers configured in a stack ranging from three to N layers, where N is an integer up to 128.

In an example, each of the transformers is configured within one or more DIMCs such that each of the transformers comprises a plurality of matrix multipliers including QKV matrices configured for an attention layer of a transformer followed by three fully-connected matrices (FC). In this configuration, the DIMC is configured to accelerate the transformer and further comprises a dot product of $Q K^T$ followed by a softmax $(Q K^T/\text{square root } (d_k))V$. In an example, the AI accelerator apparatus also includes a SIMD device (as shown in FIGS. 3A and 3B) configured to accelerate a computing process of the softmax function.

Using a transformer like BERT Large, NLP requires very high compute (e.g., five orders of magnitude higher than CV). For example, BERT Large requires 5.6 giga-multiply-accumulate operations per second ("GMACs") per transformer layer. Thus, the NLP inference challenge is to deliver this performance at the lowest energy consumption.

Although the present invention is discussed in the context of a BERT Large transformer for NLP applications, those of ordinary skill in the art will recognize variations, modifications, and alternatives. The particular embodiments shown can also be adapted to other transformer-based models and other AI/machine learning applications.

According to an example, the present invention provides for a dispatch engine (DE) apparatus using a hardware and software co-designed structure for efficient distributed control over the execution of AI-related workloads in an AI accelerator apparatus. The DE apparatus is a dedicated hardware unit configured to manage resource availability, dispatch work units asynchronously, and aggregate work unit completions.

Figure 7A:
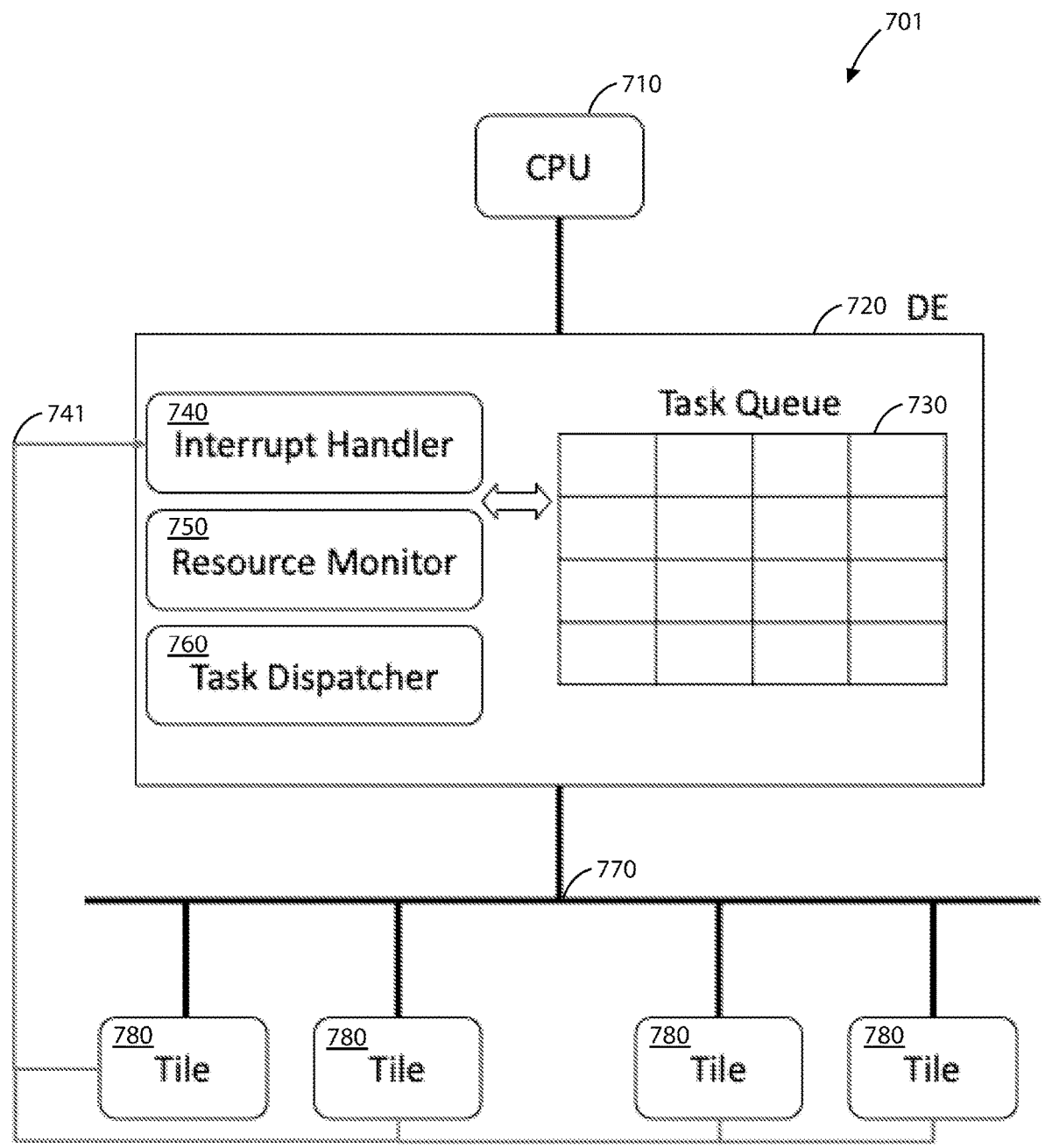
FIG. 7A is a simplified diagram illustrating an AI accelerator apparatus with a dispatch engine (DE) according to an example of the present invention.

FIG. 7A is a simplified block diagram of an AI accelerator apparatus 701 with a dispatch engine (DE) apparatus 720 according to an example of the present invention. As shown, the AI accelerator apparatus includes a CPU 710 coupled to the DE apparatus 720, which can be configured to control the execution of one or more portions of an AI workload (e.g., work units, tasks, task groups, etc.) at a plurality of destination devices 780 through a bus device 770. These destination devices can include previously discussed devices, such as slices, CPUs, or other similar devices.

Figure 7B:
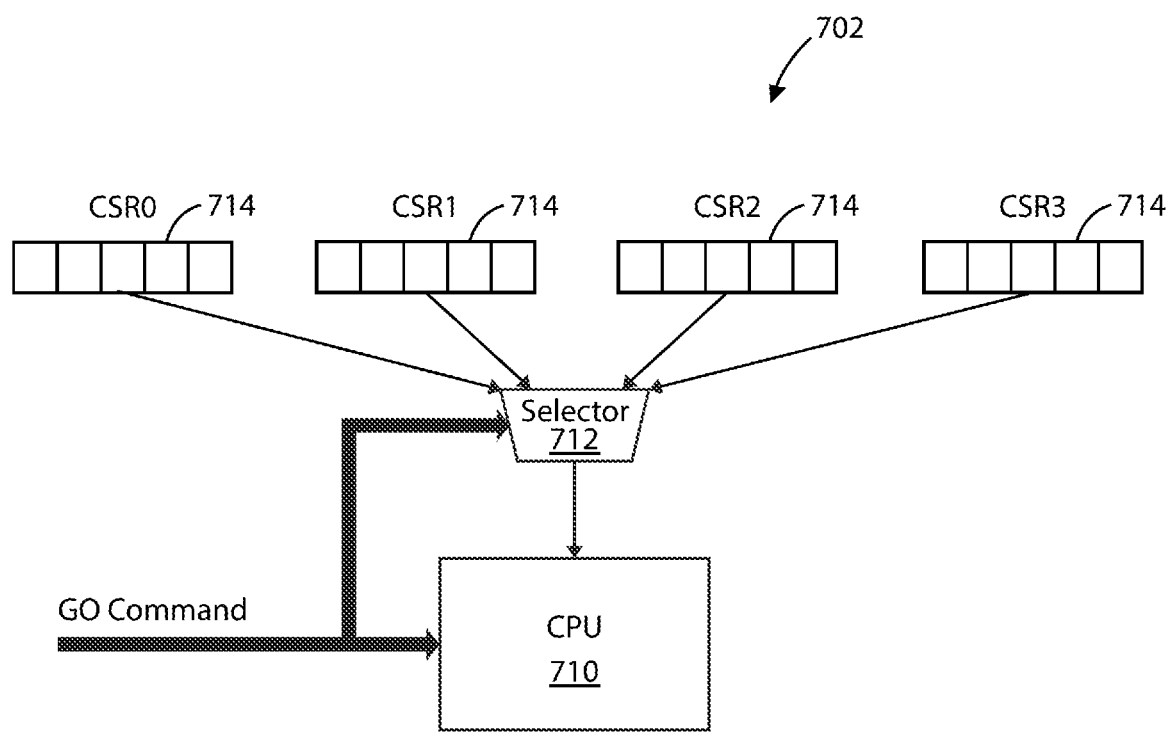
FIG. 7B is a simplified diagram illustrating a CPU command queue configuration according to an example of the present invention.

In an example, the CPU 710 has a command queue (see FIG. 7B). When the CPU 710 executes a command from its command queue, it communicates with the DE apparatus 720 to process the command. In a specific example, the CPU 710 can communicate with the DE apparatus 720 by generating instruction packets (e.g., CSR packets, or the like) and writing them to the control set of the DE apparatus 720.

In an example, the DE apparatus 720 can include a task queue module 730, a completion/interrupt handler module 740, a resource monitor module 750, and a task dispatcher module 760. The task queue module 730 can be configured to receive one or more task groups from the CPU 710 to be performed by the destination devices 780. This task queue module can include a plurality of rows (labeled from 1 to N), a plurality of columns (labeled from 1 to M), and a plurality of cells defined by one of the plurality of rows and one of the plurality of columns (e.g., cell [N, M]). In a specific example, the task queue module includes at least four rows and four columns (as shown in FIG. 7), and these rows and columns can be expanded depending on the application.

Each of the task groups can have a plurality of work units configured in a hierarchy of queues determined by the CPU 710, which can help to perform these work units efficiently (see FIG. 10 for further details). The task queue module can be configured to store each of the plurality of work units of each task group in one of the plurality of cells such that all such work units are stored within the task queue module according to the hierarchy of queues.

The completion handler module 740 can be configured to send one or more completion signals upon a completion condition to update the status of the task queue module 720. In a specific example, the completion handle module 740 can be coupled between each of the plurality of cells in the task queue module and each of the plurality of destination devices (shown by connection 741). The completion condition can include a completion of a work unit stored in one of the plurality of cells by one of the plurality of destination devices, a completion of a task group stored in the plurality of cells by the plurality of destination devices, or other similar criteria.

The resource monitor module 750 can be configured to monitor a state of each of the plurality of destination devices. In a specific example, the resource monitor module 750 is configured to monitor the destination devices by inferentially checking the status of each of the plurality of cells (e.g., using cell status to determine when a destination device has completed performing an associated work unit). In another example, the resource monitor module 750 is configured to monitor the destination devices by polling each such destination device using the bus device 780 (e.g., requesting status information directly).

The task dispatcher module 760 can be coupled to the task queue module 720, and be configured to asynchronously dispatch the work units stored the plurality of cells of the task queue module 720 to one of the plurality of destination devices 780 in a parallel pipeline process. In a specific example, the task dispatcher module 760 is coupled to each of the plurality of cells and is configured using the bus device such that each cell is configured to communicate through the bus device to one of the plurality of destination devices. Example state diagrams related to these modules are shown in FIGS. 8A, 8B, 9A, and 9B.

The DE apparatus 720 can also further include a clocking device coupled to the CPU device 710 and configured such that the CPU device 710 can write to each of the cells with the intended work unit at a predetermined rate and pre-define efficiency. In a specific example, the predetermined rate can range from once every ten clock cycles to once every clock cycle, and the pre-defined efficiency can range from about 80% to 90%.

According to an example, FIG. 7A shows a more detailed configuration of the DE module shown in the previously discussed AI apparatuses and chiplet devices. For example, the CPU 710 can correspond to a tile/gang CPU 221 of FIGS. 2A and 2B, and the destination devices 780 correspond to the slices 220. In the case of multiple chiplet devices, the AI accelerator apparatus can also have a global DE apparatus configured to a global CPU (see FIG. 11). Similar to the configuration between the DE apparatus and the slices, the global DE can be configured to distribute portions of the AI workload across the tile/gang CPUs in the chiplet or across the chiplets in an AI accelerator apparatus.

FIG. 7B is a simplified diagram representing CPU command queue configuration in an AI accelerator apparatus according to an example of the present invention. As shown, device 702 includes a CPU 710 coupled to a selector device 712 (e.g., multiplexer, or the like), which is coupled to a plurality of control/status registers (CSRs) 714. When the CPU 710 and the selector device 712 receive an instruction signal (e.g., GO command), the selector device 712 can pass the command or data stored in the selected CSR to the CPU 710 to perform a desired task. These tasks can include populating the DE task queue 730 as discussed for FIG. 7A, processing computations of work units within a slice device as discussed for FIG. 3A, sending portions of an AI workload to different tile devices as shown in FIG. 2A, etc. In this case, there are four CSRs 714 denoted CSR0 to CSR3, but the total number of CSRs can vary depending upon device architecture and the intended application.

These CSRs can be implemented for tile/gang CPUs or global CPUs coupled to a plurality tile/gang CPUs. The CSRs can be reprogrammed at any time by the associated CPUS. Those of ordinary skill in the art will recognize other variations, modifications, and alternatives to these CPU and DE configurations.

Figure 8A:
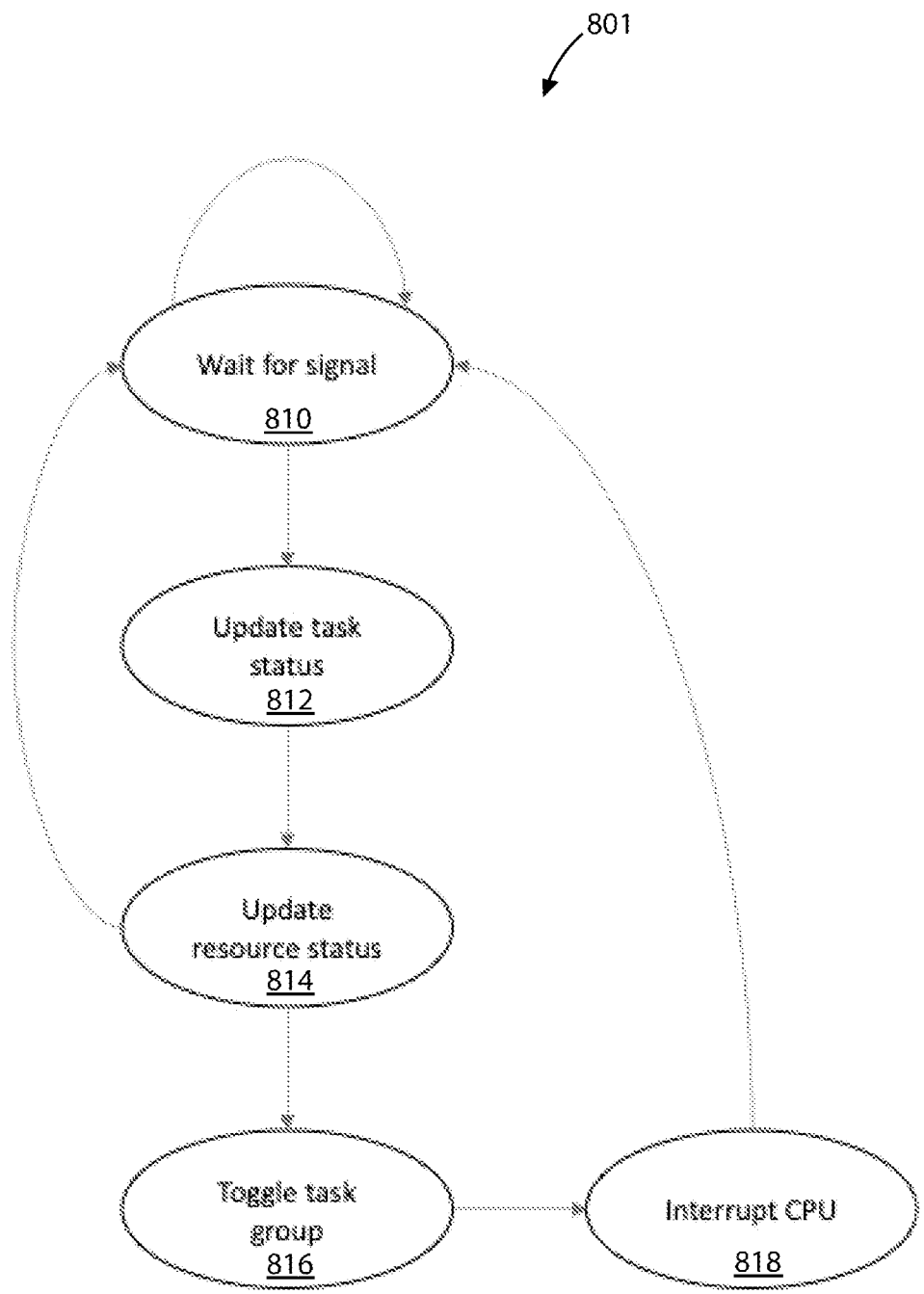
FIGS. 8A and 8B are simplified state diagrams illustrating methods of operating a DE apparatus according to examples of the present invention.

FIG. 8A is a simplified state diagram 801 illustrating a method of operating a DE apparatus according to an example of the present invention. As shown in diagram 801, the default state 810 of the completion handler is waiting for an update signal. Once an update signal is received, the task status can be updated in state 812, and the resource status can be updated in state 814. If no task group is completed, the state returns to the default state 810. Upon completion of a task group, the task group is toggled in state 816 and the CPU is interrupted in state 818 before returning to the default state 810.

Figure 8B:
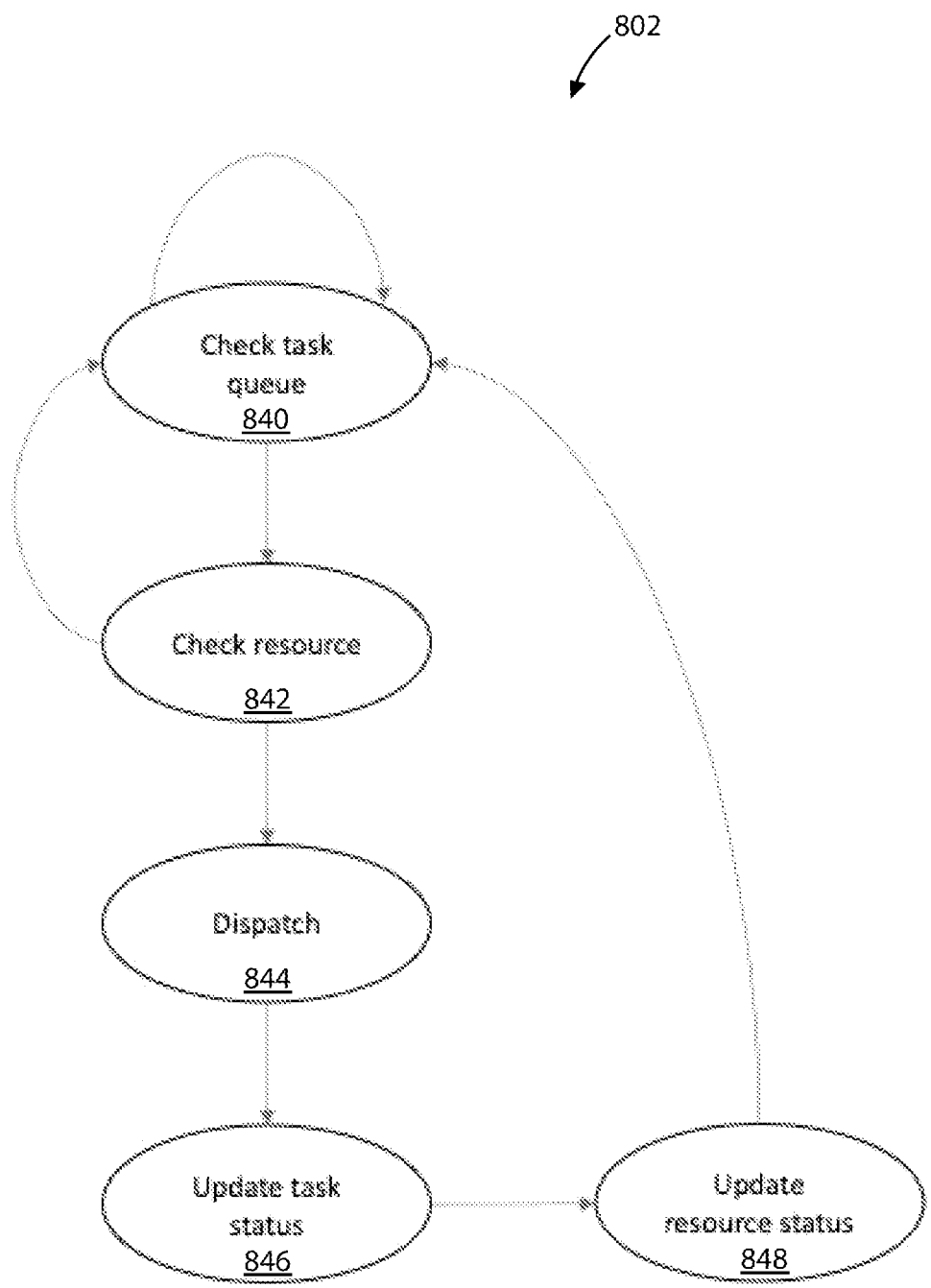

FIG. 8B is a simplified flow diagram 802 illustrating a method of operating a DE apparatus according to an example of the present invention. As shown in diagram 802, the default state 840 of the dispatcher is checking the task queue. When there is a task designated for a certain resource (e.g., destination device, or the like), the resource is checked in state 842. The state returns to the checking the task queue and checking the resource until the resource is free, at which point the task is dispatched in state 844, the related task status is updated in state 846, and the related resource status is updated in state 848 before returning to the default state 840.

Figure 9A:
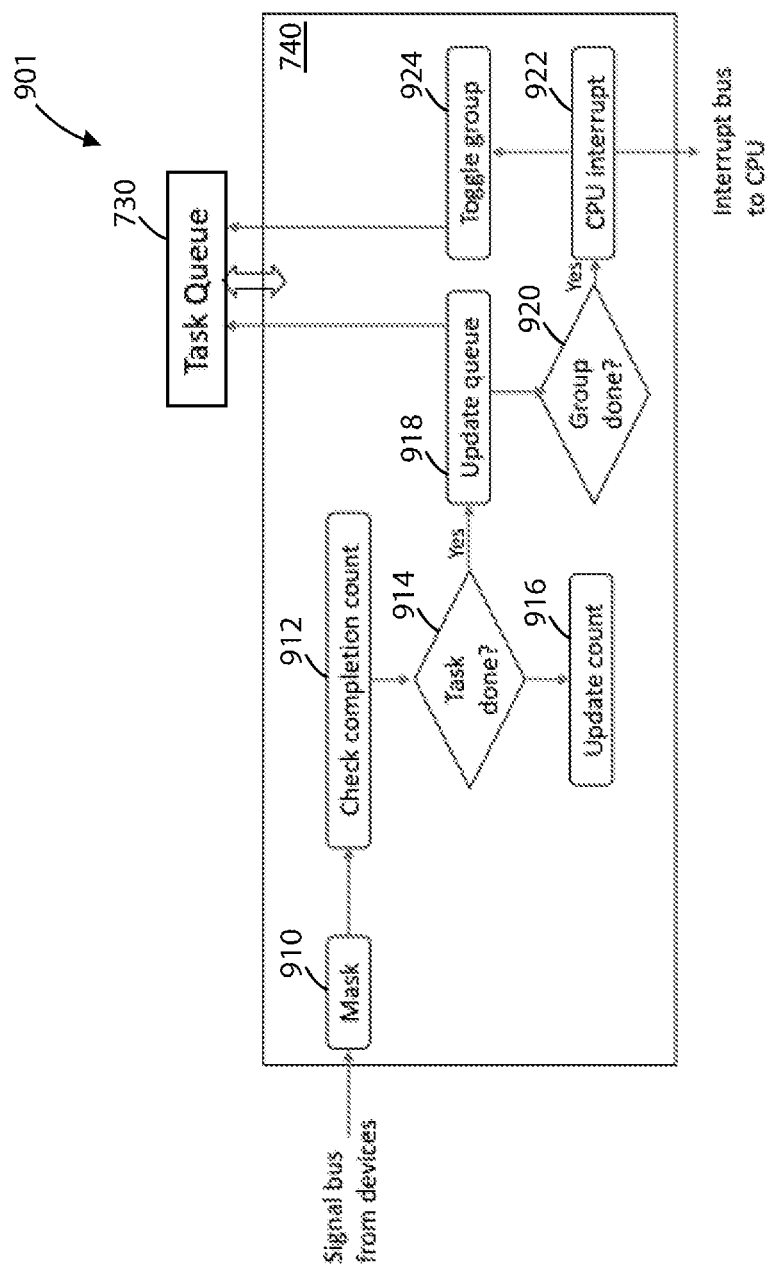
FIGS. 9A and 9B are simplified flow diagrams illustrating methods of operating a DE apparatus according to examples of the present invention.
Figure 9B:
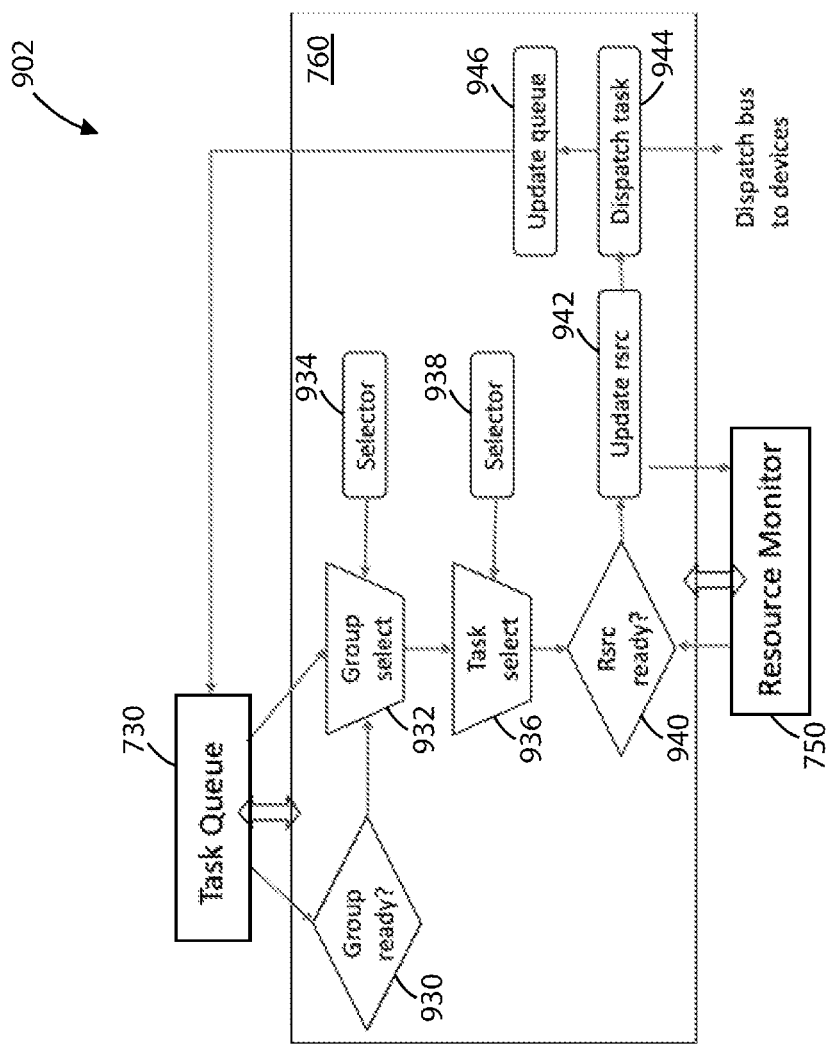

In an example, a compute workload can include tasks organized into groups. FIGS. 9A and 9B are simplified flow diagrams illustrating a method of operating a DE apparatus according to an example of the present invention. These diagrams show the operation of the interrupt/completion handler 740, the resource monitor 750, and the task dispatcher 760 with the task queue 730 as described in FIG. 7A.

The diagram 901 shows an example process flow for a DE interrupt/completion handler 740. Here, the completion handler 740 receives completion signals related to a task from a signal bus coupled to one or more destination devices (e.g., tiles, slices, other CPUs, etc.). A mask is applied to the incoming signals in step 910. The completion count based on the completion signals received is checked in step 912, and the completion of the task is checked in step 914. If the task is not done, the completion count is updated in step 916. When the task is done, the task queue 730 is updated in step 918. Similarly, the queue 730 continues to be updated following the completion of tasks until the completion of the task group is checked in step 920. Once the task group is determined to be done, the completion handler 740 sends an interrupt to the CPU in step 922 to signal completion, which can be sent via an interrupt bus coupled between the completion handler 740 and the CPU. Following the interrupt in step 922, the task group can be toggled to accommodate another task group.

The diagram 902 shows an example process flow for a DE task dispatcher 760. Here, the dispatcher 760 checks if a particular DE task group is ready in step 930. Then, the group is selected in step 932 with the selector signal in step 934, then a task from the task group is selected in step 936 with the selector signal in step 938. The dispatcher 760 communicated with the resource monitor 750 to check if the resources to perform the task is ready in step 940. When the resource is ready, the status of the resource is updated (e.g., busy, assigned, etc.) in step 942, and then the task is dispatched in step 944 via a dispatch bus coupled to the resources. Following the task dispatch, the queue is updated (e.g., dispatched, in progress, etc.) in step 946.

In an example, the present invention provides a compute accelerator apparatus configured to perform one or more tasks using at least a first buffer, a second buffer, a third buffer, a matrix multiplication (MM) unit, and a memory storage device. Using a combination of multiple work descriptors/control sets, the programming CPU can create work ahead-of-time and group work items to optimize usage of the most critical resources.

In the case of a matrix multiplication task, the CPU can program a first control set with addresses to load a first matrix data from memory to the first buffer, a second control set with addresses to load a second matrix data from memory to the second buffer, the MM unit control set to perform the multiplication between data from the first and second buffers and to write the result to the third buffer, and a third control set with addresses to load the result from the third buffer to memory.

Regarding the DE, the CPU writes a first GO command for loading the first matrix data into a first DE group as a first task, a second GO command for loading the second matrix data into the first DE group as a second task, and then the CPU marks the first DE group as "ready". Also, the CPU writes a third GO command for performing the matrix multiplication into a second DE group as the first task, a fourth GO command for storing the result into a third DE group as the first task. These DE groups can be determined by the CPU according to the hierarchy of queues discussed previously.

Given the GO commands, the DE checks the availability of the first buffer, second buffer, and memory storage device; and then executes the first DE group (loading the first and second matrix data) when all resources are available. After receiving notice that the tasks of the first DE group have been completed, the DE checks the availability of the MM unit and the first, second, and third buffers, and then executes the second DE group (multiplying the first and second matrix data) when all resources are available. After receiving notice that the task of the second DE group has been completed, the DE checks the availability of the third buffer and the memory storage device, and then executes the third DE group (storing the matrix result) when all resources are available. After receiving notice that the task of the third DE group has been completed, the DE interrupts the CPU so that the CPU can read the result from memory.

FIGS. 8A, 8B, 9A, and 9B show example methods of operating a DE apparatus configured to coordinate the performance of a tasks, such as matrix operations and other computations. Any states or steps described in these figures may be repeated, removed, rearranged, or combined for various computation tasks, such as the previous matrix multiplication example. Of course, there can be variations, modifications, and alternatives to the state diagram and command flow implementations shown previously.

Figure 10A:
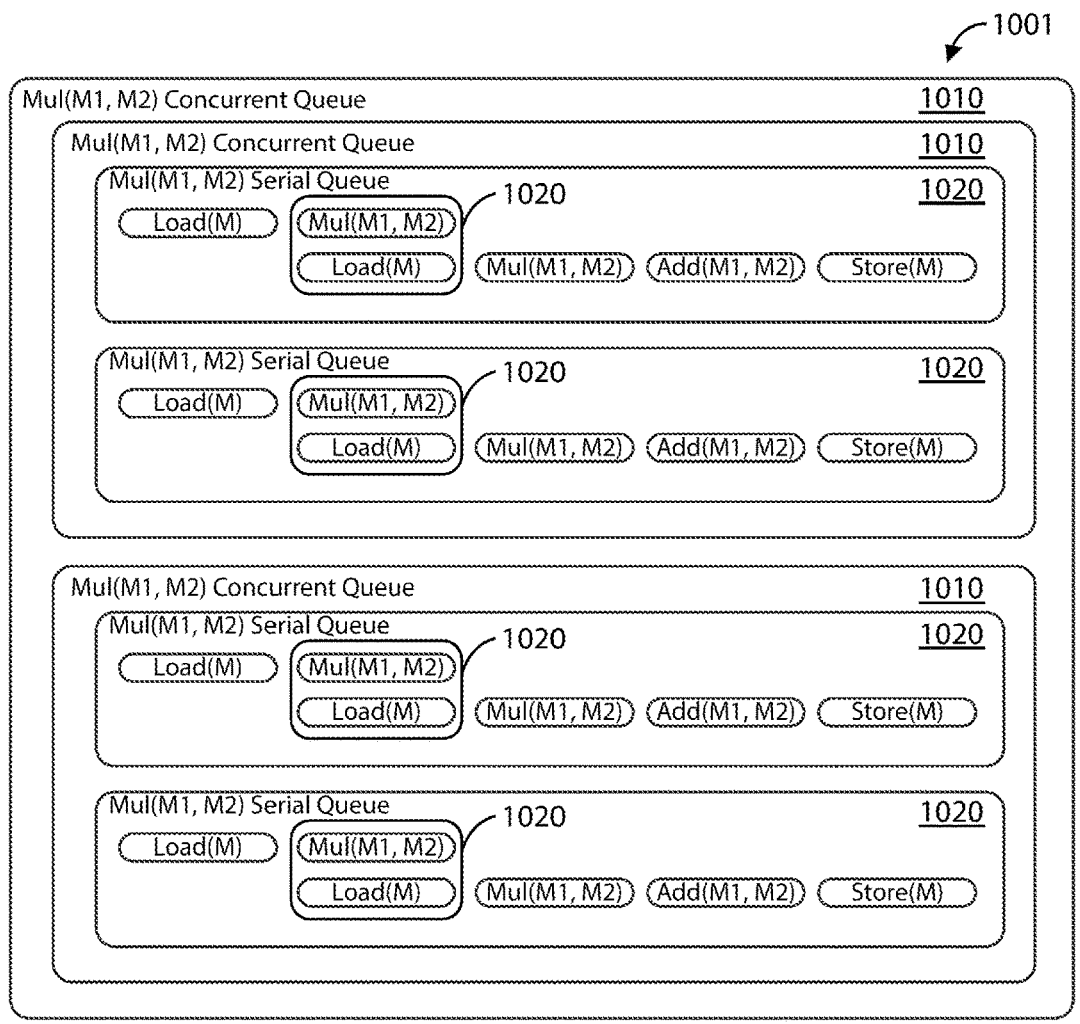
FIGS. 10A and 10B are simplified block diagrams representing a hierarchy of queues scheme according to an example of the present invention.
Figure 10B:
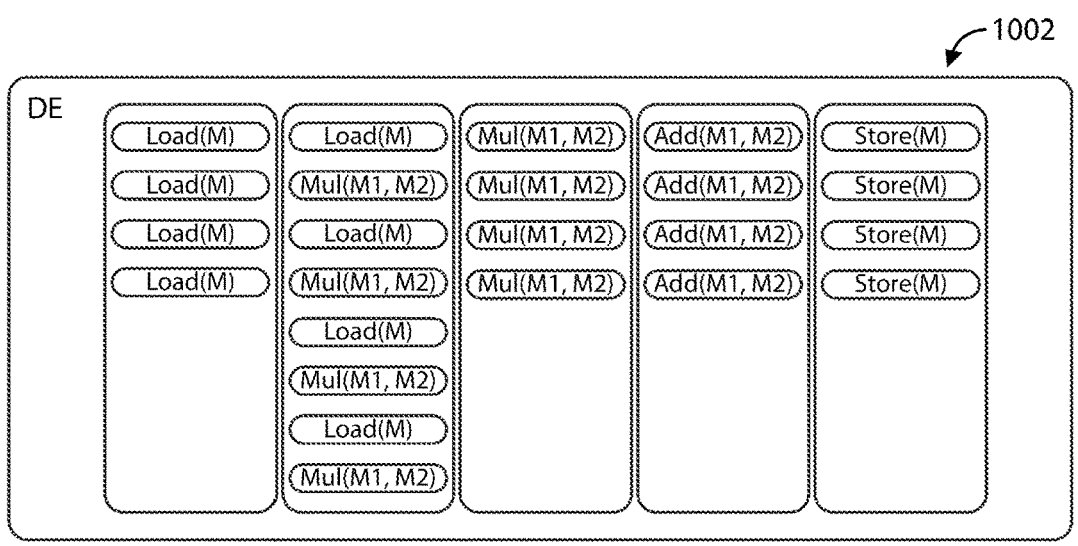

FIGS. 10A and 10B are simplified block diagrams illustrating a hierarchy of queues scheme according to an example of the present invention. FIG. 10A shows an example task group 1001 with a plurality of work units related to matrices. Here, the work units relate to matrix computations, including loading a matrix (Load), performing a matrix multiplication (Mul), performing a matrix addition (Add), and storing a matrix (Store). These work units are organized according to a hierarchy of queues to orders and optimizes the performance of all work units within the task group.

To organize the work units, the hierarchy includes concurrent queues 1010 and serial queues 1020. Work units organized within concurrent queues can be performed in parallel, while work units within serial queues must be performed sequentially. In an example, the system architecture of the AI accelerator is configured to perform work units in parallel by default. In this case, the implementation of serial queues can include one or more task queue barriers stored within the task queue module and configured to force the associated work units to be performed sequentially.

As shown in FIG. 10A, each of the concurrent queues and serial queues can further include concurrent or serial queues in a nested configuration to efficiently order the work units to be performed at their respective destination device. Here, the lowest level serial queues include the following sequence of matrix computations: (1) load a first matrix, (2) perform a first matrix multiplication and load a second matrix in parallel, (3) perform a second matrix multiplication, (4) perform a matrix addition, and (5) store a result matrix. This can represent a hierarchy of queues for the computation of matrix functions, such as the self-attention function discussed previously.

FIG. 10B shows a resulting task queue representation corresponding to the example hierarchy of queues shown in FIG. 10A. Here, the work units are divided into five sequential steps (e.g., using task queue barriers) configured such that all work units within each step can be performed in parallel. The first step includes all of the work units for loading the first matrix. The second step includes all of the work units for performing the first matrix multiplication and loading the second matrix. The third step includes all of the work units for performing the second matrix multiplication. The fourth step includes all of the work units for performing the matrix addition. And, the fifth step includes all of the work units for storing the result matrix.

The CPU can be configured to determine these hierarchies of queues in software to enable the DE apparatus to store the plurality of work units of one or more task groups in its hardware implementation to be carried out by the destination devices. This approach to representing graphs (such as machine learning models) using hierarchies of queues makes the graphs self-updating. Those of ordinary skill in the art will recognize other variations, modifications, and alternatives to the application of the hierarchy of queues scheme.

According to an example, the present invention provides for methods of compiling the data representations related to transformer-based models mapping them to an AI accelerator apparatus in a spatial array. These methods can use the previously discussed numerical formats as well as sparsity patterns. Using a compile algorithm, the data can be configured to a dependency graph, which the global CPU can use to map the data to the tiles and slices of the chiplets. An example mapping methods are shown in FIG. 11.

Figure 11:
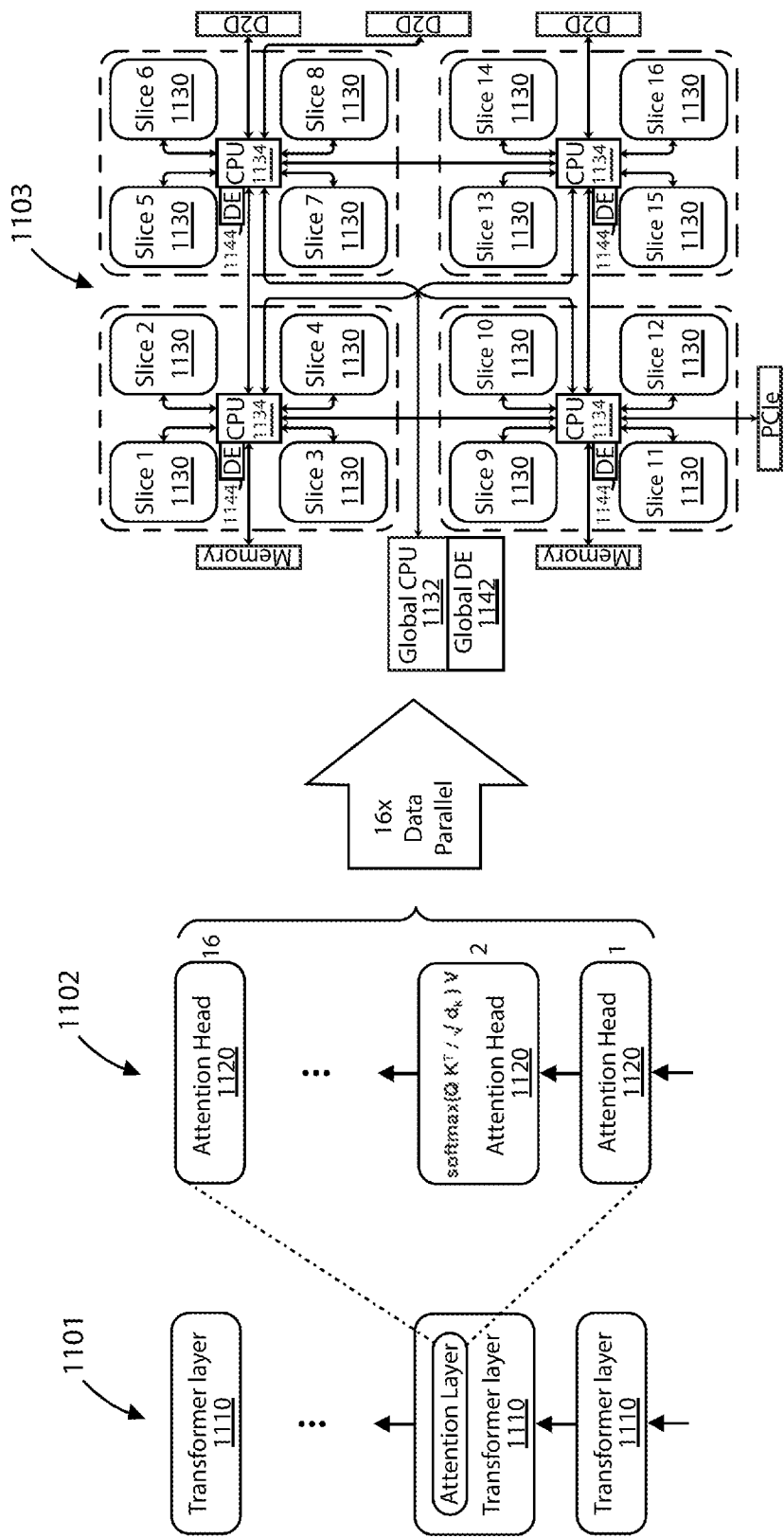
FIG. 11 is a simplified block flow diagram illustrating a mapping process between a transformer and an AI accelerator apparatus according to an example of the present invention.

FIG. 11 is a simplified block flow diagram illustrating a mapping process between a transformer and an example AI accelerator apparatus. As shown, a transformer 1101 includes a plurality of transformer layers 1110, each having an attention layer 1102. In this case, there are 16 attention heads 1110 (e.g., BERT Large) computing the attention function as discussed previously. These 16 attention heads are mapped to 16 slices 1130 of an AI accelerator apparatus 1103 (similar to apparatuses 201 and 202) via global CPU 1132 communicating to the tile CPUs 1134. Further, a global DE 1142 is configured with the global CPU 1132 to communicate with the tile CPUs 1134, and tile DEs 1144 are configured with the tile CPUs 1134 to communicate with the slices 1130. The configuration of the global DE 1142 and tile DEs 1144 can be similar to the apparatus 700 shown in FIG. 7.

While the above is a full description of the specific embodiments, various modifications, alternative constructions and equivalents may be used. As an example, the AI accelerator apparatus and chiplet devices can include any combination of elements described above, as well as outside of the present specification. Therefore, the above description and illustrations should not be taken as limiting the scope of the present invention which is defined by the appended claims.

What is claimed is:

1. A chiplet device, the device comprising:
   a plurality of tiles, each of the tiles comprising a plurality of slices, a central processing unit (CPU) coupled to the plurality of slices, and a dispatch engine device coupled to the CPU;
   wherein the dispatch engine device comprises:
   a task queue module having a plurality of cells, the task queue module being configured to receive one or more task groups, each of the task groups having a plurality of work units configured in a hierarchy of queues, and wherein the task queue module is configured to store each of the plurality of work units of each task group in one of the plurality of cells such that the plurality of work units of each task group are stored according to the hierarchy of queues;
   a bus device coupled between the plurality of cells in the task queue module and the plurality of slices such that each cell is configured to communicate through the bus device to one of the plurality of slices;
   a completion handler module coupled between the plurality of slices and each of the plurality of cells in the task queue module and configured to send a completion signal upon a completion condition to update a status of one or more of the plurality of cells;
   a resource monitor module coupled to each of the plurality of cells in the task queue module and configured to monitor a state of each of the slices; and
   a task dispatcher module coupled to each of the plurality of cells in the task queue module and configured to asynchronously dispatch the work unit stored in each of the plurality of cells to one of the plurality of slices in a parallel pipeline process using the bus device;
   a plurality of die-to-die (D2D) interconnects coupled to each of the CPUs in each of the tiles;
   a peripheral component interconnect express (PCIe) bus coupled to the CPUs in each of the tiles;
   a dynamic random access memory (DRAM) interface coupled to the CPU in each of the tiles; and
   a global CPU interface coupled to each of the CPUs in each of the plurality of tiles.

2. The device of claim 1 wherein the hierarchy of queues includes one or more concurrent queues, each of the concurrent queues having at least a portion of the plurality of work units of the task group, and wherein the task queue module is configured to store each such work unit in one of the plurality of cells; or
   wherein the hierarchy of queues includes one or more serial queues, each of the serial queues having at least a portion of the plurality of work units of the task group, and wherein the task queue module is configured to store each such work unit in one of the plurality of cells and to store one or more task queue barriers configured to cause the task dispatcher module to dispatch the portion of the plurality of work units stored in the plurality of cells in a serial process.

3. The device of claim 1 wherein the resource monitor module is configured to monitor the state of each of the plurality of destination devices by inferentially checking the status of each of the plurality of cells or by polling each destination device using the bus device.

4. The device of claim 1 wherein the task queue module is coupled to the CPU, the CPU being coupled to each of the plurality of cells in the task queue module and configured to transfer each of the plurality of work units of the one or more task groups into one of the plurality of cells in the task queue module according to the hierarchy of queues; and
   wherein the CPU is configured to determine the hierarchy of queues for each of the one or more task groups.

5. The device of claim 1 wherein the completion handler module is coupled to the CPU, the completion handler module being configured to send the completion signal to the CPU.

6. The device of claim 1 wherein the task dispatcher module is configured to asynchronously dispatch the unit of work stored in each of the plurality of cells to one of the plurality of destination devices based on the state of the destination device.

7. An AI accelerator apparatus, the apparatus comprising:
   a plurality of chiplets, each of the chiplets comprising a plurality of tiles, and each of the tiles comprising a plurality of slices, a central processing unit (CPU) coupled to the plurality of slices, and a dispatch engine device coupled to the CPU;
   wherein the dispatch engine device comprises:
   a task queue module having a plurality of cells, the task queue module being configured to receive one or more task groups, each of the task groups having a plurality of work units configured in a hierarchy of queues, and wherein the task queue module is configured to store each of the plurality of work units of each task group in one of the plurality of cells such that the plurality of work units of each task group are stored according to the hierarchy of queues;
   a bus device coupled between the plurality of cells in the task queue module and the plurality of slices such that each cell is configured to communicate through the bus device to one of the plurality of slices;
   a completion handler module coupled between the plurality of slices and each of the plurality of cells in the task queue module and configured to send a completion signal upon a completion condition to update a status of one or more of the plurality of cells;
   a resource monitor module coupled to each of the plurality of cells in the task queue module and configured to monitor a state of each of the slices; and
   a task dispatcher module coupled to each of the plurality of cells in the task queue module and configured to asynchronously dispatch the work unit stored in each of the plurality of cells to one of the plurality of slices in a parallel pipeline process using the bus device;
   a plurality of die-to-die (D2D) interconnects coupled to the each of CPUs in each of the tiles;
   a peripheral component interconnect express (PCIe) bus coupled to the CPUs in each of the tiles;

a dynamic random access memory (DRAM) interface coupled to the CPUs in each of the tiles;
a global CPU coupled to each of the CPUs in each of the tiles; and
a global dispatch engine coupled to the global CPU and configured to cause the global CPU to transfer the one or more task groups to each CPU in the plurality of chiplet devices, and wherein each CPU is configured to transfer each of the plurality of work units of the one or more task groups into one of the plurality of cells in the task queue module according to the hierarchy of queues.

* * * * *